United States Patent
Rose, Jr. et al.

(10) Patent No.: US 12,411,253 B1
(45) Date of Patent: Sep. 9, 2025

(54) PULSE SHAPE DISCRIMINATION SYSTEM FOR HIGH DENSITY IMAGING

(71) Applicant: UT-Battelle, LLC, Oak Ridge, TN (US)

(72) Inventors: Paul Rose, Jr., Knoxville, TN (US); Lorenzo Fabris, Knoxville, TN (US); James T Matta, Knoxville, TN (US); Gianluigi De Geronimo, New York, NY (US)

(73) Assignee: UT-Battelle, LLC, Oak Ridge, TN (US)

( * ) Notice: Subject to any disclaimer, the term of this patent is extended or adjusted under 35 U.S.C. 154(b) by 187 days.

(21) Appl. No.: 18/384,208

(22) Filed: Oct. 26, 2023

Related U.S. Application Data

(60) Provisional application No. 63/425,013, filed on Nov. 14, 2022.

(51) Int. Cl.
*G01T 1/17* (2006.01)

(52) U.S. Cl.
CPC .................. *G01T 1/17* (2013.01)

(58) Field of Classification Search
CPC .................................................. G01T 1/17
See application file for complete search history.

(56) References Cited

U.S. PATENT DOCUMENTS

| | | | | |
|---|---|---|---|---|
| 3,745,408 A | * | 7/1973 | Emmons | H04N 1/4056 315/30 |
| 3,842,312 A | * | 10/1974 | Emmons | H04N 1/4056 315/30 |
| 4,355,230 A | * | 10/1982 | Wilson | H05G 1/265 378/207 |
| 4,727,256 A | * | 2/1988 | Kumazawa | G01T 1/247 250/370.1 |
| 4,733,398 A | * | 3/1988 | Shibagaki | H01S 5/06835 369/116 |
| 4,937,452 A | * | 6/1990 | Simpson | G01T 1/24 250/370.06 |
| 5,225,682 A | * | 7/1993 | Britton, Jr. | G01T 1/17 250/369 |

(Continued)

OTHER PUBLICATIONS

Heath et al., "Development of a Portable Pixelated Fast-Neutron Imaging Panel," IEEE Transactions of Nuclear Science, vol. 69, No. 6, Jun. 2022 (5 pages).

*Primary Examiner* — Blake C Riddick
(74) *Attorney, Agent, or Firm* — Lempia Summerfield Katz LLC

(57) ABSTRACT

An application specific integrated circuit includes a differential amplifier and a first pulse shaper that generate a full integration of an amplified radiation detection signal. A second pulse shaper generate a partial integration of the amplified radiation signal. A third pulse shaper generates a timing signal simultaneously with the partial integration and the full integration. Peak detectors measure and store maximum values of the full integration and the partial integration. A time to amplitude converter measures an incidence of a radiological event that generated the radiation detection signal in the form of a voltage ramp. A controller enables the transfer of the maximum value of the full and partial integrations and the voltage in response to discriminated values.

20 Claims, 18 Drawing Sheets
(10 of 18 Drawing Sheet(s) Filed in Color)

(56) References Cited

U.S. PATENT DOCUMENTS

| | | | | |
|---|---|---|---|---|
| 5,532,944 | A * | 7/1996 | Battista | G01T 1/17 708/3 |
| 5,831,567 | A * | 11/1998 | Seki | H03M 1/361 341/155 |
| 7,136,003 | B1 * | 11/2006 | Ripley | H04L 25/03834 341/147 |
| 7,411,198 | B1 * | 8/2008 | Holland | G06G 7/18 327/345 |
| 7,521,682 | B1 * | 4/2009 | Holland | G01T 1/17 250/370.08 |
| 9,229,119 | B1 * | 1/2016 | Taguchi | G01T 1/185 |
| 2003/0033097 | A1 * | 2/2003 | Tanaka | G01T 1/171 702/60 |
| 2005/0246140 | A1 * | 11/2005 | O'Connor | G01R 19/04 702/189 |
| 2007/0024841 | A1 * | 2/2007 | Kloza | G01S 7/486 356/5.03 |
| 2008/0018505 | A1 * | 1/2008 | Astley | G01T 1/17 341/51 |
| 2010/0078569 | A1 * | 4/2010 | Jarron | A61B 6/037 250/363.04 |
| 2011/0098980 | A1 * | 4/2011 | Ouvrier-Buffet | H03K 5/08 702/189 |
| 2011/0284753 | A1 * | 11/2011 | Carroll | G01T 1/17 250/369 |
| 2012/0298875 | A1 * | 11/2012 | Ueno | G01T 1/17 250/362 |
| 2013/0146767 | A1 * | 6/2013 | Seino | G01T 1/17 250/336.1 |
| 2014/0188418 | A1 * | 7/2014 | Inoue | G01R 29/027 702/66 |
| 2015/0083913 | A1 * | 3/2015 | Kinugasa | G01T 1/171 250/336.1 |
| 2015/0185332 | A1 * | 7/2015 | Herrmann | H03M 1/125 250/336.1 |
| 2016/0170037 | A1 * | 6/2016 | Katsuyama | G01T 1/164 250/336.1 |
| 2016/0204566 | A1 * | 7/2016 | Field | H01S 3/134 372/38.01 |
| 2016/0269006 | A1 * | 9/2016 | Itakura | H03K 5/1532 |
| 2016/0313459 | A1 * | 10/2016 | Scoullar | G06F 30/20 |
| 2016/0377745 | A1 * | 12/2016 | Daerr | G01T 1/247 250/371 |
| 2017/0059718 | A1 * | 3/2017 | Masunaga | G01T 1/023 |
| 2018/0356502 | A1 * | 12/2018 | Hinderling | G01S 7/4818 |
| 2019/0154847 | A1 * | 5/2019 | Ohashi | G01T 1/17 |
| 2019/0210896 | A1 * | 7/2019 | Inanaga | B01D 53/00 |
| 2020/0064500 | A1 * | 2/2020 | Steadman Booker | H03K 5/1532 |
| 2020/0182983 | A1 * | 6/2020 | Calder | H10F 77/959 |
| 2021/0227154 | A1 * | 7/2021 | Muto | H04N 23/30 |
| 2023/0029181 | A1 * | 1/2023 | Herrmann | A61B 6/03 |
| 2023/0204799 | A1 * | 6/2023 | Aoki | G01T 1/17 250/336.1 |
| 2023/0291407 | A1 * | 9/2023 | Krishnan | H03K 21/08 |
| 2024/0302505 | A1 * | 9/2024 | Maierbacher | G01S 7/4865 |

* cited by examiner

PULSE SHAPE DISCRIMINATION SYSTEM FOR HIGH DENSITY IMAGING

1. PRIORITY CLAIM

This application claims priority to U.S. Provisional Patent Application No. 63/425,013, titled "ASIC for Pulse Shape Discrimination Using Multi-Shaper Methods for High Channel Density Imaging", which was filed on Nov. 14, 2022, which is herein incorporated by reference.

2. STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

3. TECHNICAL FIELD

This disclosure relates to signal analysis, focusing specifically on systems that differentiate radiation signals through pulse shape discriminations.

4. RELATED ART

Differentiating between different radiation types can be challenging. In some environments, background noise is stronger than the radiation itself. In other environments, radiation produces electromagnetic interference that imitates different radiation types. In some environments, the computational resources needed to differentiate different radiation types makes it impractical to identify differences.

In many environments, multiple types of radiation exists. The energy spectra of these different types of radiation may overlap, generating mixed radiation areas. The characteristics of these different radiation types may constantly change. Radiation exist in unexpected places that are inaccessible to stationary detectors. Many radiation detectors attempt to differentiate radiation signals but they are inefficient, lack sensitivity, energy intensive, and lack the computational power to distinguish them.

DESCRIPTION OF THE DRAWINGS

The patent or application file contains at least one drawing executed in color. Copies of this patent or patent application publication with color drawing(s) will be provided by the Office upon request and payment of the necessary fee. The components in the figures are not necessarily to scale, emphasis instead being placed upon illustrating the principles of the invention. Moreover, in the figures, like-referenced numerals designate corresponding parts throughout the different views.

DETAILED DESCRIPTION

Figure 1:
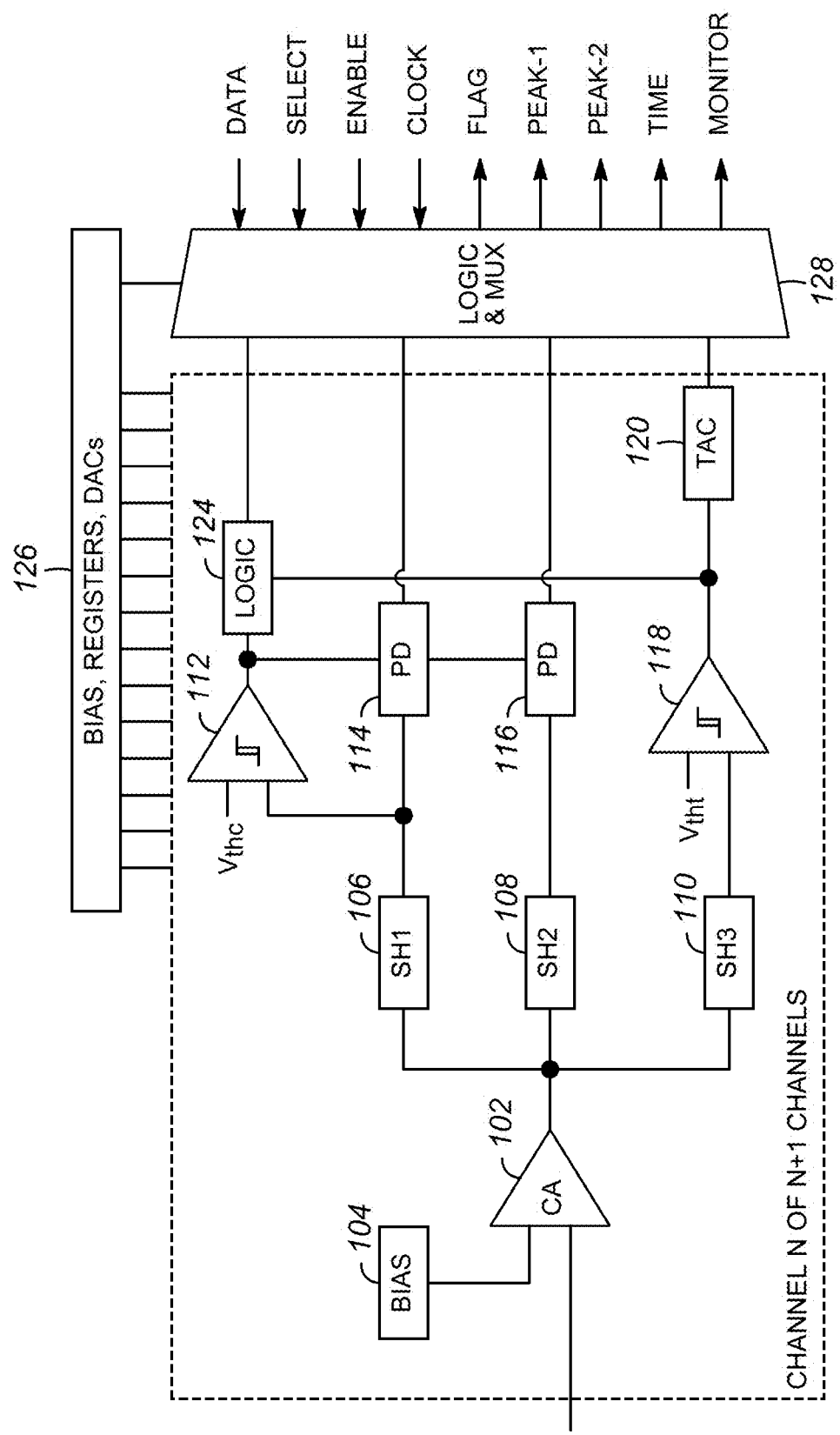
FIG. 1 is an exemplary channel of a pulse shape discriminator with a peak detector circuit shown as a unitary circuit.

Application specific integrated circuits (referred to as system(s)) provide precise and accurate detections and discrimination of radioactive particles. Some or all of the detections and/or discriminations may occur in real-time. The systems distinguish different types of radiations, particles, and/or its signals. Differences may be based on the pulses generated by the scintillators and detected by the silicon photomultipliers they interface. The pulse shapes may represent the energy and charge collections given off by an ionizing radiation interaction, with the intensity and timing varying with the type of radiation interacting with it.

While many customized integrated circuit's functionality cannot be changed or updated once manufactured, the disclosed system can be reconfigured to discriminate between radiation types and/or particles radiating from different radiation sources. Because many environments are filled with noise that introduces volatility into radiation detectors, especially in environments inaccessible to stationary systems, the disclosed validation systems used by the systems discriminate between desired signals and interference.

The systems are configurable to meet the fixed and/or variable requirements of a particular application. They include a configurable number of channels (e.g., sixty-four channels) formed on a single integrated circuit that allow input such as the pulses generated and amplified by an input stage to be processed continuously (e.g., without interruption) in real time. Because the system's analog circuits do not require frequent switching between high and low voltages and are purposely built for low power applications, the system's customization optimizes processing speed, performance, power efficiency in a small mobile chip.

In an exemplary use case, the system's discrimination analyzes output associated with different events based on the types of particle that created the events. The particles may comprise a photon, an electron, a beta particle, a neutron, a deuteron, a triton, an alpha particle, an ionized nucleus, etc., for example. The systems render high precision timing of those events and provide energy information for spectroscopic analysis.

The self-contained circuits that comprise the system include multiple functional circuits processing within many channels that may be individually programmed on a channel-by-channel basis or collectively programmed and reprogrammed electronically across all the channels that reside on a chip during operation. In other words, the programming can provide real-time changes to circuit parameters such as time constants, and/or other circuit settings processing one or more or all of channels while the circuits are in active operation while providing accurate radiological identifications. The initial detections processed by these systems may be provided by scintillators, multiple silicon photomultiplier detectors, and/or other sources and sensors. Each channel is connected to a separate group of the silicon photomultipliers detectors such that the channels may process the electrical signals generated by the silicon photomultipliers detectors they are connected to in real time, independently, in parallel, and/or simultaneously to the other channels that reside on the chip.

In operation, pulses are divided and transmitted to a signal integration circuit comprising two or more pulse shapers that generate integration-like output. While pulse shapers are often designed to shape the temporal characteristics of pulses and are not typically used as integrators, some pulse shapers in this system are configured to convert voltage signals into charge signals rendering an output that approximates an integrated signal over time by accumulating charges over multiple pulses. The use of pulse shapers as integrators reduces the size, weight, and power requirements of some systems.

Each pulse shapers including those configured to perform integrations (also referred to as an integrator shaper) may have multiple programmable time constants that directly influence the integrity of the outputs and/or integrations. In some systems, the programmable time constants directly control the duration of the integration or processing time with smaller time constants resulting in shorter integrations or processing times and larger time constants resulting in longer integrations or processing times. In some systems, the programmable time constants influence rise and fall times of the output, with larger time constants resulting in slower transitions than larger time constants. In some systems, the programmable time constants determine how quickly the pulse shapers responds to changes in the input signal received with shorter time constants providing faster and more rapid integrations to input changes than longer time constants. In some systems, the programmable time constants execute a synchronization that adjusts the timing and/or the phase of the pulse shapers to the incoming signals.

In a use case, multiple programmable time constants were adjusted in the pulse shapers to discriminate between different particles and/or events. By these auto-controlled automatic adjustments, the systems optimized circuitry to adapt to different environments and process specific pulse shapes associated with varying energy levels associated with different radiation types and/or particle types in different operating environments.

The output of the integrator shapers are processed by instantaneous measuring circuits that capture and hold maximum values for a period time, which represents the maximum energy of an integration, allowing logic to measure and process those maximum values with the accumulated signals. The output of the circuits may then be digitized (optional) and transmitted as data to different parts of a post-processing circuits via a bus that connects different parts of the system and enables the transfer of information. The information is thereafter processed to differentiate and identity different radiation types, such as differentiating neutron rays from gamma rays.

The system's timing and validation circuits ensure the accuracy and integrity of processed signals through logical conditions and rules that determine the signals validity. Through a logic based validation the system compares signal measurements (e.g., amplitudes, etc.) to thresholds, which ensures that the system's detections are free of noises and/or meet specified criteria before they are transferred with timing information to a post processing. The system also provides programmable processes to adjust the energy thresholds for circuit bias, circuit trimming, and gain matching.

In FIG. 1 signals generated by the scintillators, silicon photomultiplier detectors, and/or etc. are processed by an amplifier circuit that serves an exemplary channel of a multichannel integrated circuit. The amplifier circuit includes a low distortion differential preamplifier 102 that boosts low-level radiation detection signal's amplitude which improve its signal-to-noise ratio and enhances its sensitivity. The differential preamplifier 102 preserves the integrity of the original signal without distorting the original signal's quality.

Figure 2:
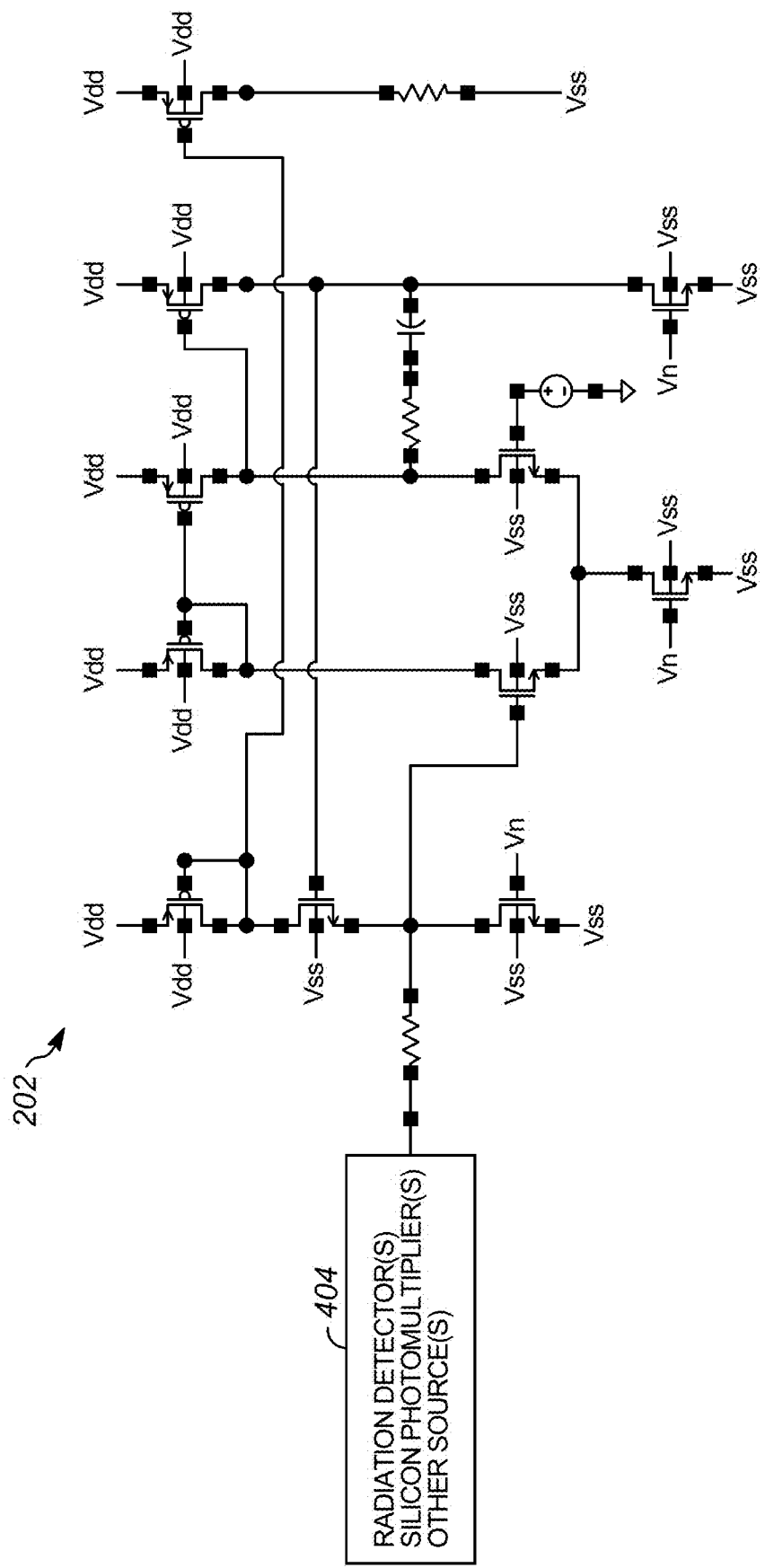
FIG. 2 is an exemplary current amplifier circuit that may be used in FIGS. 1 and 3.

In FIG. 1, a programmable biasing circuit 104 applies a programmable voltage and/or current to the differential preamplifier 102 with a programmable gain. In an exemplary radiation detector, the programmable biasing circuit 104 is programmed through an interface 126 and a digital-to-analog converter responsive to a processor such as a field programmable gate array 314 (shown in FIG. 3). The programmable biasing circuit 104 provides a programmable range of adjustable increments that vary with the type of radiation detectors the systems interface, the light collection medium used, the expected energy of the particles to be detected, etc. In an exemplary use case, the preamplifier 102 comprises a differential preamplifier in a current mode configuration 202 shown in FIG. 2, with the programmable biasing circuit 104 having a two volt biasing range that is trimmable in twenty-millivolts increments.

An integration circuit and timing and a validation circuit comprises two pulse shapers 106 and 108 configured as integrators and a third pulse shaper 110 configured to generate timing and validation signals. In FIG. 1, each of the pulse shapers 106, 108, and 110 have independently programmable peak times. In operation, a first pulse shaper 106 provides a full integration of the amplified radiation detection signal current processed by the preamplifier 102 with a peak time adjustable from about one-hundred nanoseconds to about four hundred nanoseconds. A second pulse shaper 108 provides a partial integration of the amplified radiation detection signal with a peak time adjustable from about forty nanoseconds to about one hundred nanoseconds, which is relatively fast compared to the first pulse shaper 106. A third pulse shaper 110 initiates precise timing measurements and validation signals from the amplified radiation detection signal with a peak time adjustable from about zero nanoseconds to about forty nanoseconds. The respective outputs of the first pulse shaper 106, the second pulse shaper 108, and the third pulse shaper 110 are shown in FIGS. 14 and 15.

Figure 14:
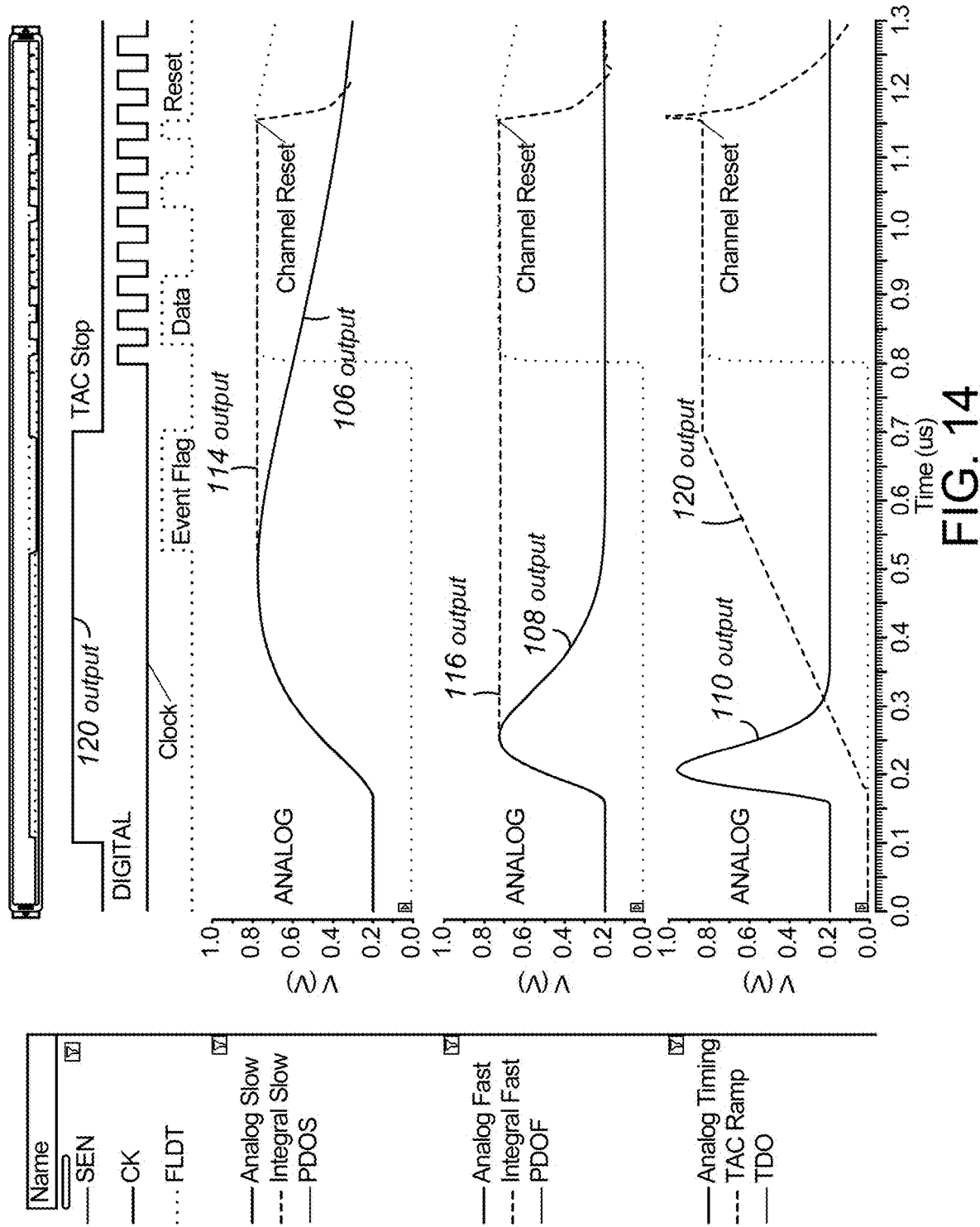
FIG. 14 is a plot of an acquisition and readout of a pulse shape discriminator imaging panel.
Figure 15:
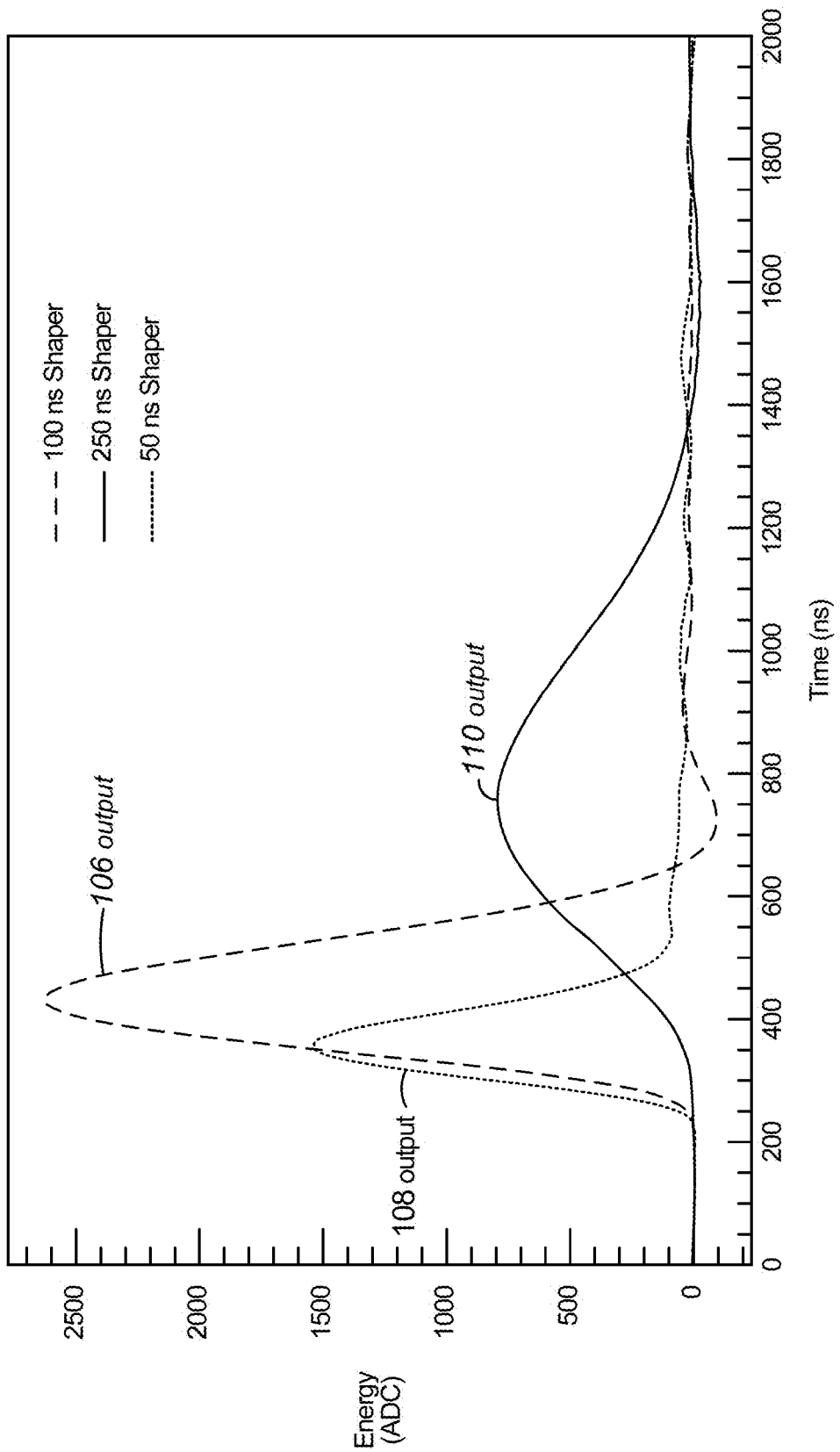
FIG. 15 is a plot of an acquisition and readout of a pulse shape discriminator imaging panel.

When a radiological event occurs, the instantaneous measuring circuits comprising the first peak detector 114 and the second peak detector 116 shown in FIG. 1 are enabled measuring and holding maximum values of their respective integrations (the signals are shown as the 114 output and the 116 output in FIG. 14), storing them in analog memories, and transferring them to interfacing logic 128 when enabled. The interfacing logic connects the detectors 114 and 116 to the system's multiplexer circuit(s). When the first peak is detected, the control logic 124 issues a notification via an event flag that is passed to the interfacing logic 128 as shown in FIG. 14.

A third pulse shaper 110 shown in FIG. 1 that is part of timing and validation circuits feeds a timing discriminator 118 when the amplified radiation detection signal is received. When the output of the timing discriminator meets or exceeds a programmable threshold or a decision boundary ($V_{tht}$), a time-to-amplitude converter (TAC) 120 translates a measured time interval, which starts with the incidence of a radiological event and ends in response to an acquisition stop or TAC stop command. The timing information in the form of a voltage ramp (shown as the 120 output in FIG. 14) precisely measures the time interval of the incidence in the analog domain. The voltage ramp is passed to the interfacing logic 128 that is converted to discrete values in the digital domain when enabled. Exemplary TAC ramp duration ramp times range from about five hundred nanoseconds to about four microseconds.

The event discriminator 112, a timing discriminator 118, and control logic 124 of FIG. 1 are part of the timing and validation circuits and render front-end validity decisions in response to input form from the first and third pulse shapers 106 and 110. The event discriminator 112 and the timing discriminator 118 utilizes a programmable threshold or a decision boundary, $V_{thc}$ and $V_{tht}$, respectively, that are referred to as predetermined thresholds or predetermined values. The thresholds and boundaries that are separately adjustable (per channel) and programmable through shared or mutually exclusive digital-to-analog converters. Processors and/or other logic that interface or are art of the system set the thresholds and/or boundaries. When the fully integrated signal and the timing signal exceed the respective threshold voltages, $V_{thc}$ and $V_{tht}$, the control logic 124 establishes a programmable validation window.

When a timing discrimination signal follows an event discrimination signal within the programmable validation window, the peak values of the system's integrations (peak-1 and peak-2) are stored in analog onboard memory and the signals are transferred to the interfacing logic 128. When the timing discriminator signal is not followed by an event discrimination signal within the programmable validation window, the control logic 124 sets a flag that automatically restores the system to a predefined state or default state through a hard or a soft rest. A hard reset resets all of the registers and the acquisition circuits (logic) of the system and a soft reset only resets the acquisition circuits (logic) of the system. Both effectively disable the transfer of any data transfer from the channel. In some systems, restoration to a predefined or default state occurs through an automatic channel reset on a channel-by-channel basis when the channel is read or an entire chip basis when all of the channels are read.

When an event discrimination signal occurs without a timing discriminator signal, the control logic 124 sets a flag and automatically restores the system to a predefined or default state in some operating conditions or allows the peak values of the integrations (peak-1 and peak-2) and the timing signal to pass to the interfacing logic 128. Once the channel is read, the control logic 124 automatically resets the channel via a soft or hard reset.

A token passing logic manages access to the data and resources on the chip to ensure a orderly communication among the nodes. In use, a token may circulate among the nodes seeking information (e.g., the peaks of the respective integrations such as peak-1 and/or peak-2, timing information, flag setting, monitoring data, etc.) in a predefined sequence or order. The token comprises a control message or marker of permissions and access rights granted to the node to store, process, and/or perform processing. When a node has possession of the token, it has the exclusive right to execute certain processes such as transmitting data, differentiating, integrations, etc. while other nodes must wait their turn to receive it. Once a nodes tasks or communication is completed, the node releases the token to a next node in a predefined sequence.

When anode or a circuit seeks information from a channel, a readout token is generated on the chip pointing to the one or more designated channels it seeks information from. When the node or circuit possesses the token, it is granted the right to perform a readout to the one or more designated channels. To perform a readout, specific commands are sent to the components or memory locations that possesses the desired data. The commands may instruct the components to make the data available to the node or circuit requesting it. For example, if peak values (peak-1 and/or peak-2), timing values, and flag conditions are requested by a node or circuit, those data objects may be provided as an output by multiplexing those data objects to an optional analog-to-digital converter. On chip controller(s) (not shown) or users may then issue the command to the remaining channels in a predefined sequence until all of the channels having validated requested information is retrieved. When a node or circuit releases the token, the channels are cleared by a hard or soft reset.

The addresses or onboard memory locations holding the requested information can be identified by monitoring or analyzing the token clock counts. Token clock counts refer to a time referenced from which the system can infer or extract relevant addresses and/or memory locations. Further, when a readout cycle is completed, the on chip controllers may automatically restore the channels to a predefined or default state transitioning one or all of the channels to an active operational state via a soft or hard reset.

Figure 3:
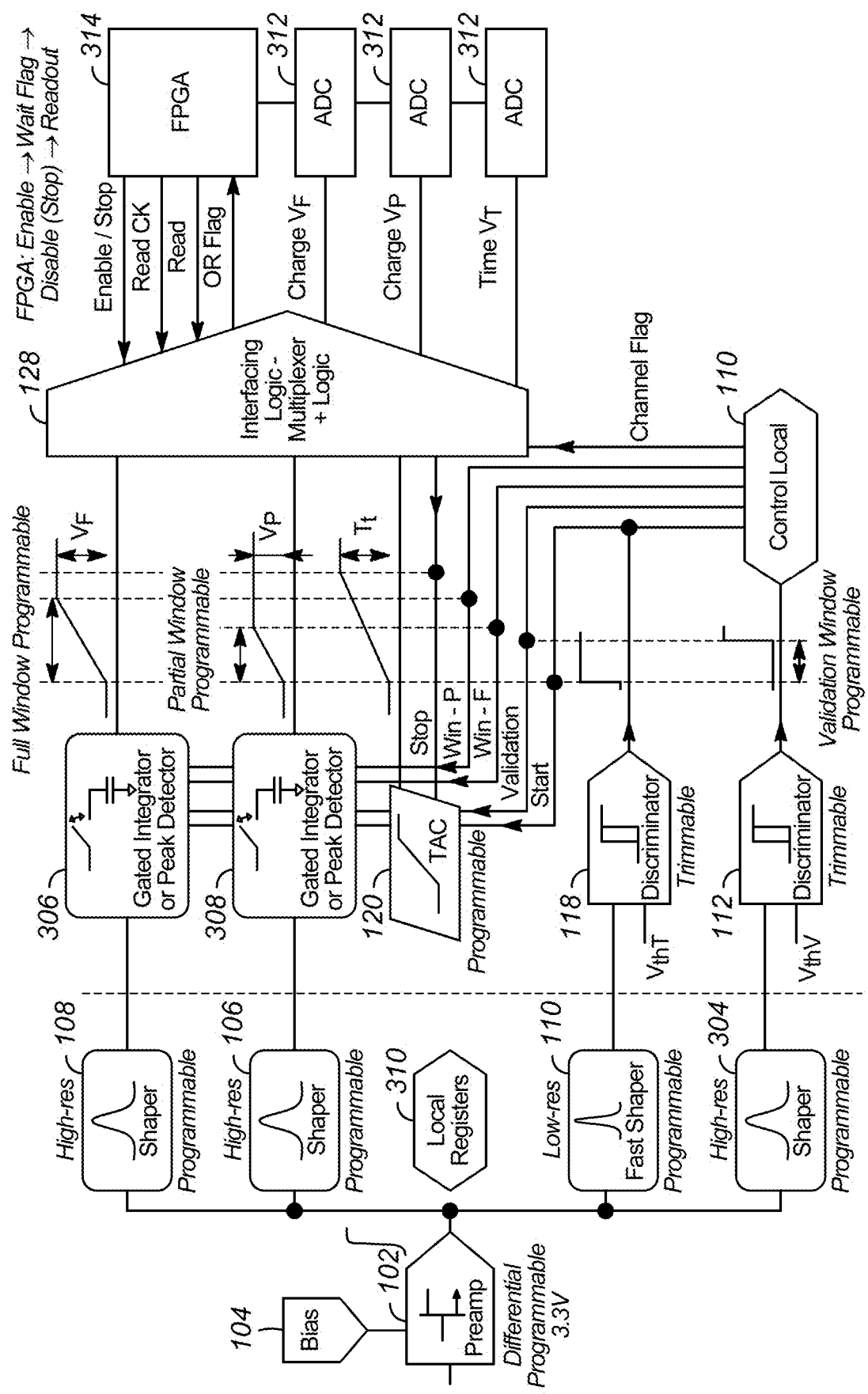
FIG. 3 is an alternative exemplary pulse shape discriminator with a peak detector circuit and gated integrator discriminator circuit comprising unitary circuits, respectively.

FIG. 3 is a channel on two application specific integrated circuits that render the functionality of FIG. 1. The first circuit uses pulse shaping integration. The second circuit uses gated integrators. A first and a second gated integrator 306 and 308 and the first and the second pulse shapers 106 and 108 with peak detectors provide a full and a partial integration of the amplified radiation detection signal, respectively. The first and the second pulse shapers 106 and 108 generate integration-like output of the amplified radiation detection when coupled to peak detectors in the disclosed system, and the temporal characteristics of amplified radiation detection coupled to a gated integrator provide integrated output in the alternative circuits.

In operation, a third pulse shaper 110, timing discriminator 118, and control logic 110 commences a time measurement that coincides with the incidence of a radiological event and ends upon receipt of an acquisition stop command from the interfacing logic 128. The fourth pulse shaper 304, event discriminator 112, and the control logic 110 establishes the upper limit of the programmable validation window and the third pulse shaper 11 and timing discriminator 118 establishes its lower limit. Analog-to-digital converters 312 convert the full integration of the amplified radiation detection signal ($V_F$), the partial integration of the amplified radiation detection signal ($V_P$), and the voltage ramp ($V_T$) into discrete data processed by the field programmable gate array 314 via interfacing logic 128. In FIGS. 1 and 3, registers 310 provide temporary data storage, data buffering, storing configuration setting, storing memory addresses, etc.

Figure 4:
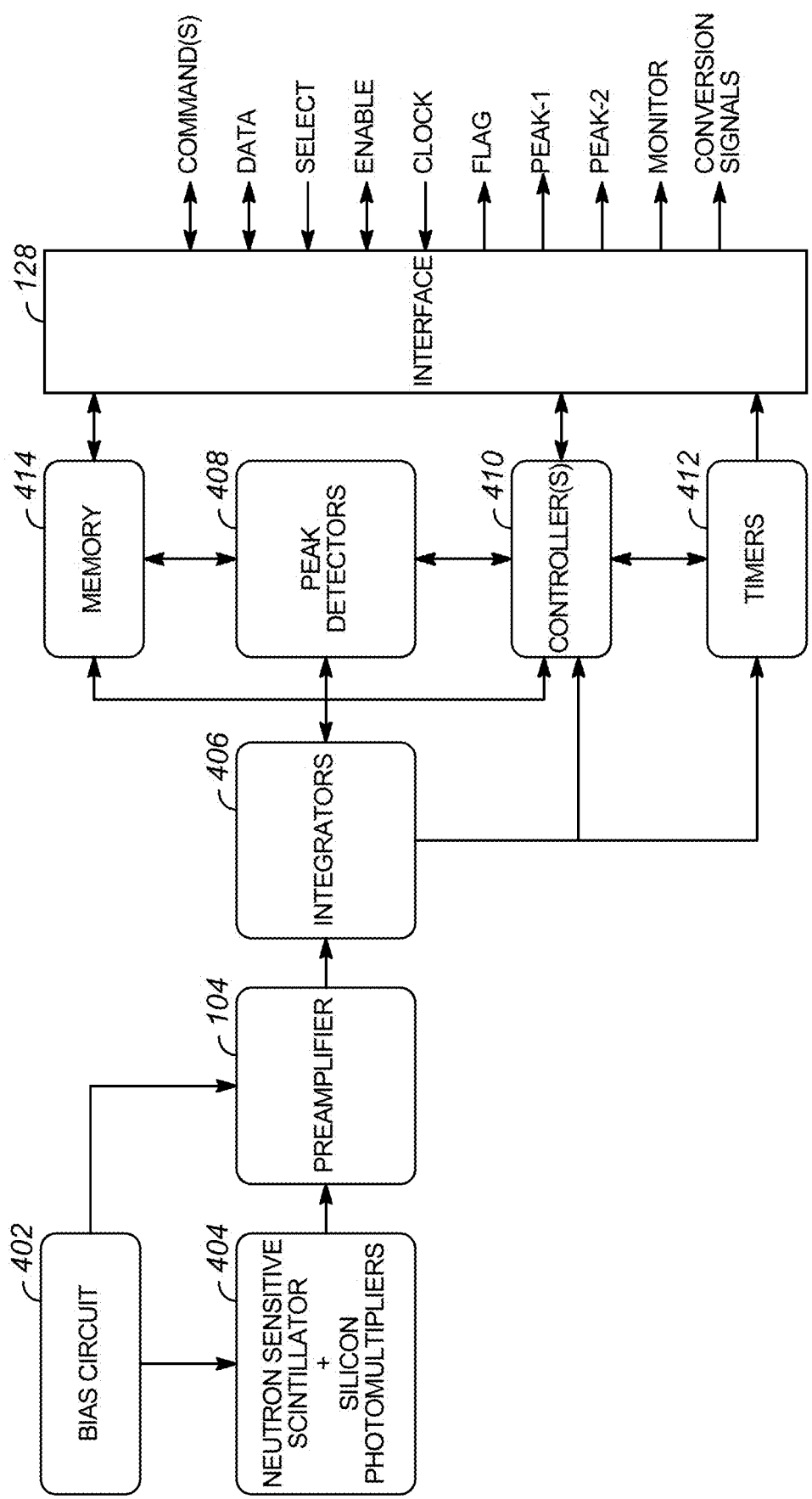
FIG. 4 is an alternative channel of a pulse shape discriminator with a peak detector circuit and an alternative gated integrator discriminator circuit.

When radiation is detected in an exemplary neutron detection system shown in FIG. 4, neutron-sensitive scintillator element generate light that is translated into current pulses by silicon-photomultiplier photosensors 404. The neutron-sensitive scintillator element emits proportional pulses of light (e.g., photons or light quanta) in response to the radiation it absorbs. The silicon-photomultiplier photosensors 404 comprise light-sensitive detectors that convert light emitted from the neutron-sensitive scintillator element into electric signals at a relatively low bias voltage that is amplified by the preamplifier 104. The bias circuits 402 applies a biasing voltage and/or current to the preamplifier 104 and the silicon-photomultiplier photosensors 404. The silicon-photomultiplier photosensors are compact, and in some applications, are tiled to form an array. Noise and timing analysis provide guidance for selecting the silicon-photomultiplier photosensors. Exemplary noise analysis and timing precision operating characteristics are shown in FIGS. 7-11.

Figure 12:
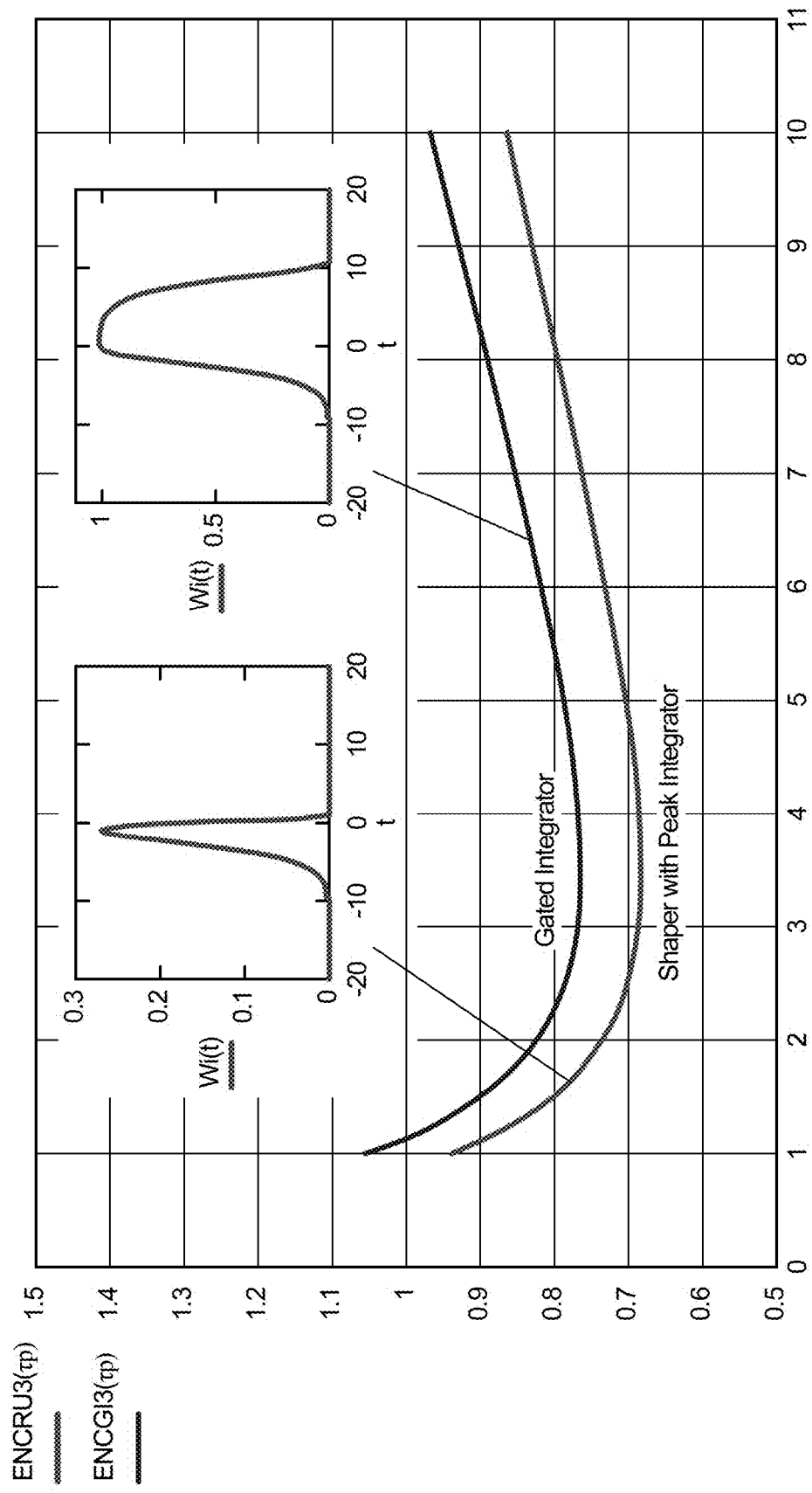
FIG. 12 is a plot in arbitrary units of an equivalent noise charge (ENC) vs peaking time for an exemplary third-order shaper that generate integration-like output with a peak detector circuit and an exemplary third-order gated-integrator circuit, respectively.
Figure 13:
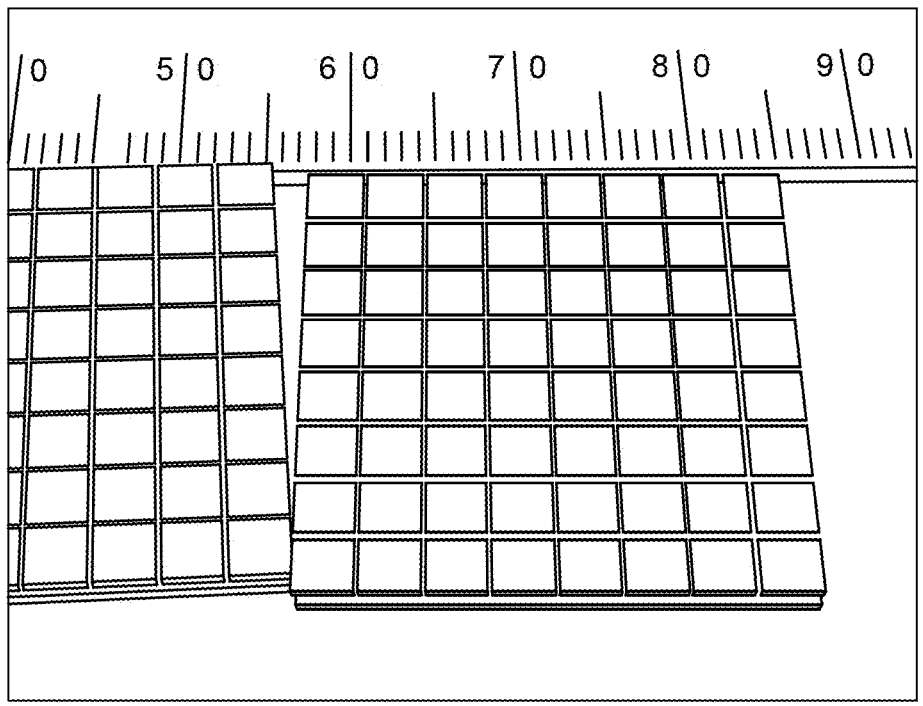
FIG. 13 is an exemplary pulse shape discriminator panel and an exemplary channel of the application specific integrated circuit shown in relation to the size of a penny.
Figure 13:
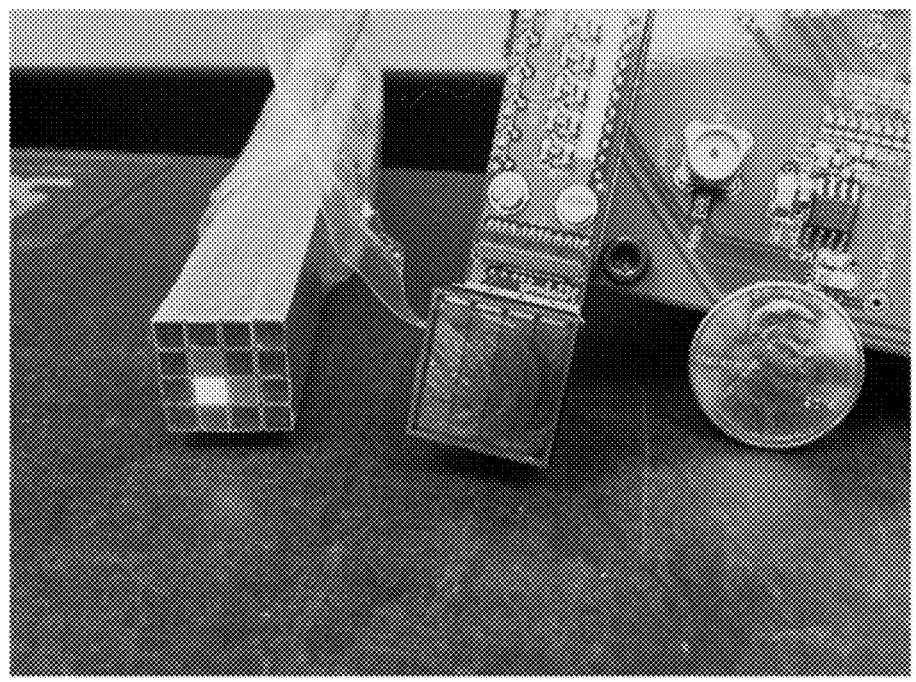

Pulse shapers and optional peak detectors 408 and/or gated integrators execute full and partial integrations 406 of the pre-amplified silicon-photomultiplier photosensor output, when a neutron event occurs. The pulse shapers generate integration-like output of the amplified neutron detection signal when coupled to the peak detectors 408 in the disclosed system and in an alternative system, shape the temporal characteristics of the amplified neutron detection signal when coupled to a gated integrator. In some systems, the selection of an integrator (e.g., between a gated integrator versus a pulse shaper with peak detector) may depend on its noise immunity and peak resolutions. As shown in FIG. 12, an exemplary third-order pulse shaper with peak detector shows superior performance with a lower noise weighting than a third-order gated-integrator.

Exemplary full and/or partial integrations may apply adjustable limits to integrate some or all of the pre-amplified silicon-photomultiplier photosensor output with the integrations beginning at the same starting point but stopping at different endpoints. In FIG. 4, one or more optional peak detectors 408 comprising a first peak detector and a second peak detector measure and hold maximum values of the partial and full integrations (peak-1 and peak-2) in onboard analog memory 414 before transferring them to the interfacing logic 128 when enabled. When a first peak is measured, the controllers 410 issue a notification via a flag that deactivate and/or stop further acquisitions by deactivating the enable signal.

A pulse shaper that feeds a timing discriminator when the amplified neutron detection signal is received from the preamplifier is part of the timing circuits 412. When the output of the timing discriminator meets or exceeds a programmable threshold or a decision boundary, a time-to-amplitude converter translates a measured time interval, which starts with the incidence of a radiological event and ends in response to an acquisition stop command (received via the interfacing logic 128). The timing information in the form of a voltage ramp precisely measures the time interval of the incidence that may be stored in the onboard memory 414 and is passed to the interfacing logic 128 that connects the system to other logic and multiplexer circuit(s) when enabled.

An event discriminator, a timing discriminator, and the the controllers 410 render some the system's front-end validity decisions. An event discriminator and the timing discriminator utilizes a programmable threshold or a decision boundary. Processors and/or external logic that interface the system set the boundaries that establish when the event and timing discriminators, respectively, respond to their respective inputs. When the fully integrated signal and the timing signal exceed their respective thresholds, the event discriminator 112 and the timing discriminator 118 render a binary decision in the form of an event discriminator signal and a timing discriminator signal, in which the timing discriminator signal is time delayed with respect to the event discriminator signal, and the time difference between the rising edges establish a programmable validation window.

When the timing discrimination signal follows an event discrimination signal within the programmable validation window, the peak values of the system's integrations (peak-1 and peak-2) are stored in analog memory 414 and the signals are transferred to the interfacing logic 128 when enabled. When the timing discriminator signal is not followed by an event discrimination signal within a programmable validation window, the controllers 410 sets a flag that initiates a hard or soft reset. When a an event discrimination signal occurs without a timing discriminator signal, the controller 410 may be programmed to set a flag and initiate a hard or soft reset in some applications or store the peak values of the integrations (peak-1 and peak-2) stored in memory 414 and pass them with the timing signal to the interfacing logic 128 when enabled. In some systems, a monitor signal may indicate the conditions or thresholds related to the system to track its performance.

Figure 16:
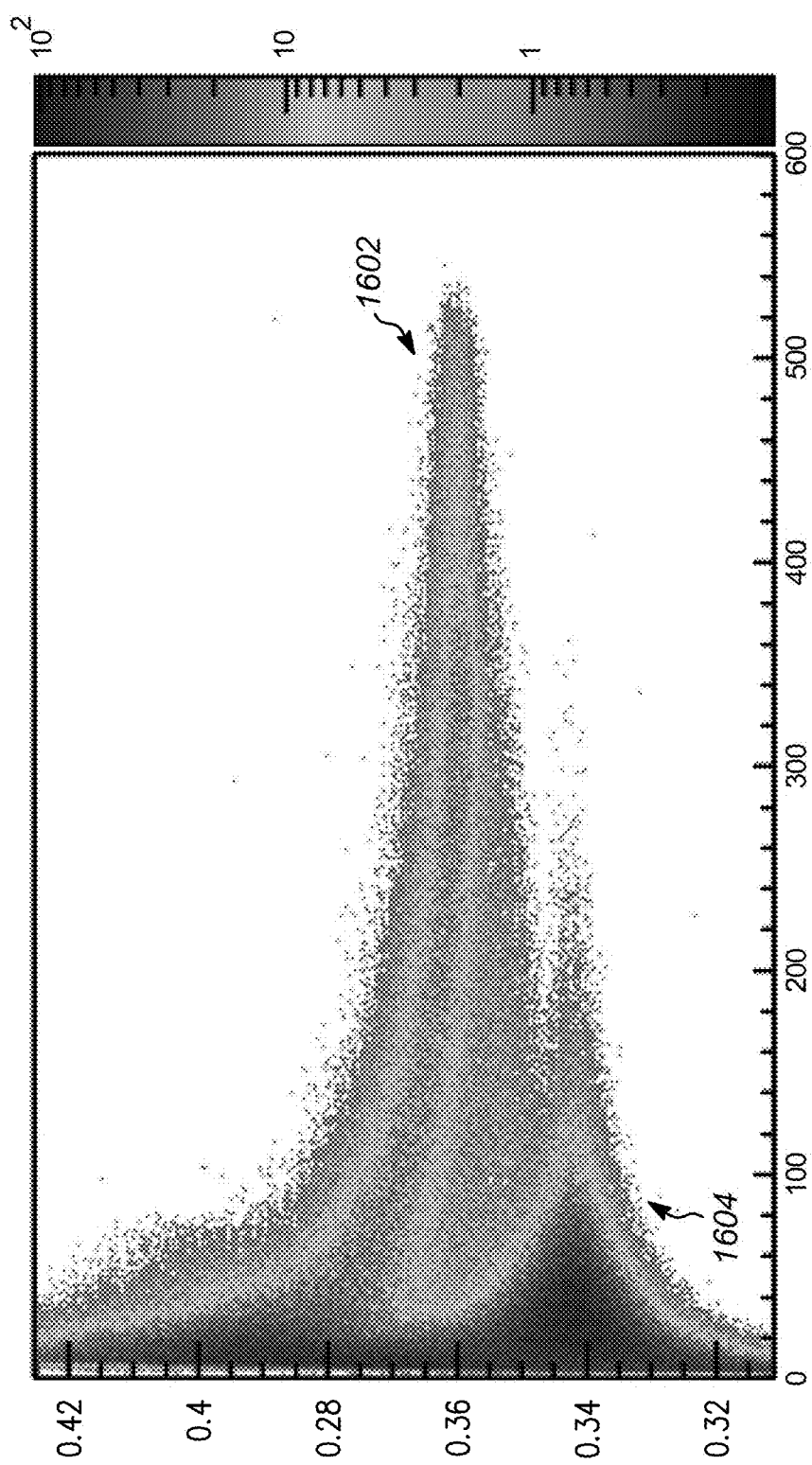
FIG. 16 is a first pulse shape discrimination plot of a neutron ray and gamma ray incidence.
Figure 17:
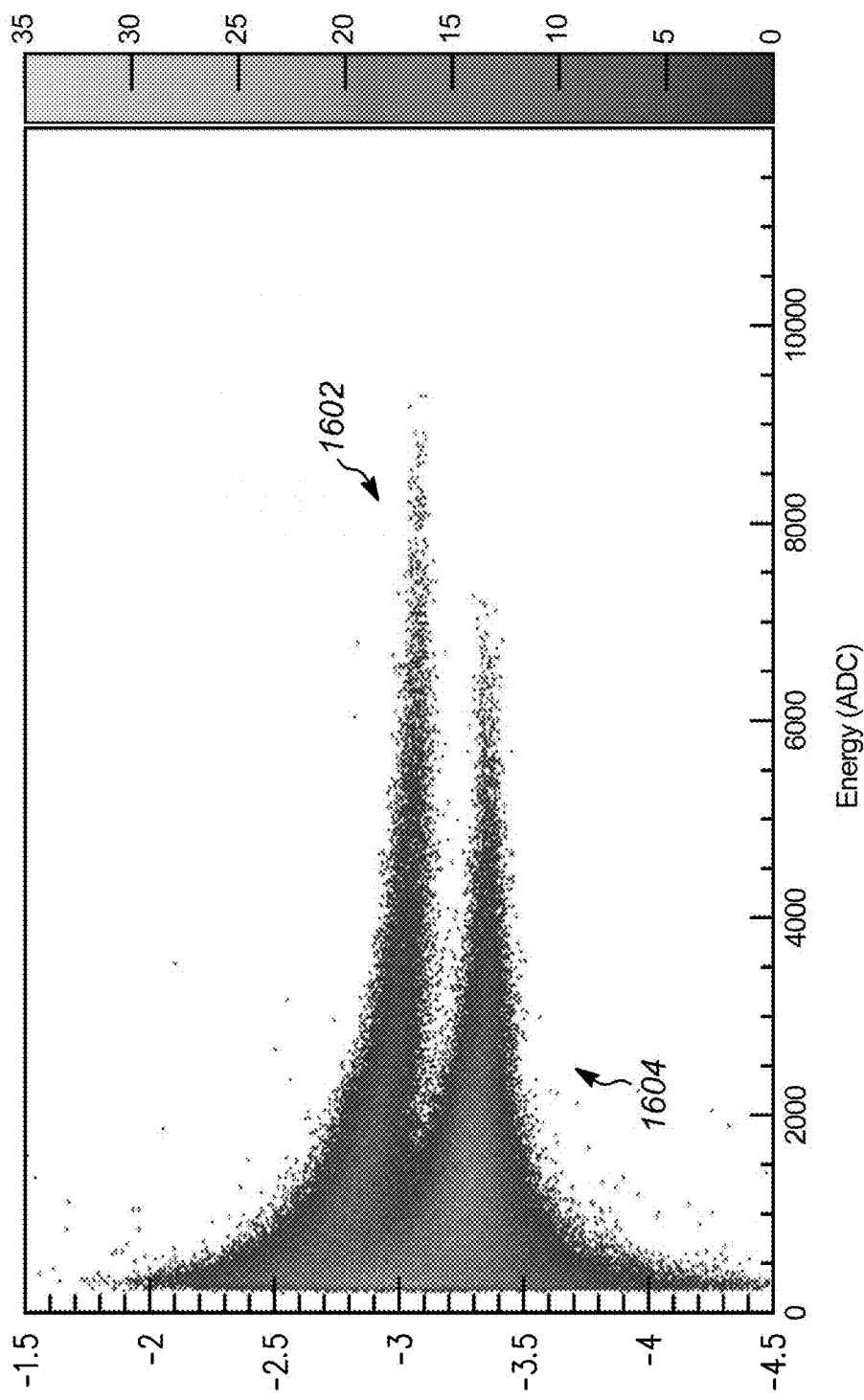
FIG. 17 is a second pulse shape discrimination plot of a neutron ray and gamma ray incidence.

Logical circuits or a processor on the chip or remote from the neutron detection system may distinguish neutron-induced events from noise and other types of radiation. In some exemplary neutron detection systems, discrimination is based on pulse-shapes, energy levels, and/or temporal information (e.g., a timestamp of the event, time-of-flight of the particle, and/or etc.). Because gamma-ray responses produce a shorter decay time constant output after incidence than neutron-ray responses, one exemplary method executes an integration and a comparison, and forms a ratio to discriminate between them. The exemplary process integrates the light produced by the neutron-sensitive scintillator by integrating the translated electrical signal produced by the silicon-photomultiplier photosensors, which is proportional to the energy of the incident radiation. The definite integration limits approximate the translated response peaking. The integral is then compared to the integration of the entire translated electrical signal or a longer interval with an integrating starting point occurring after the peak. The proportional relationship between the integrals establish the radiation type. An alternative exemplary process shapes the translated electrical signal produced by the silicon-photomultiplier photosensors, and compares the ratio's of the peak values to establish the radiation type. Exemplary ratio peaking times of a pulse shape discrimination are shown in FIGS. 16 and 17, with the top lobe 1602 identifying a neutron ray response and the lower lobe 1604 identifying a gamma ray response.

Figure 18:
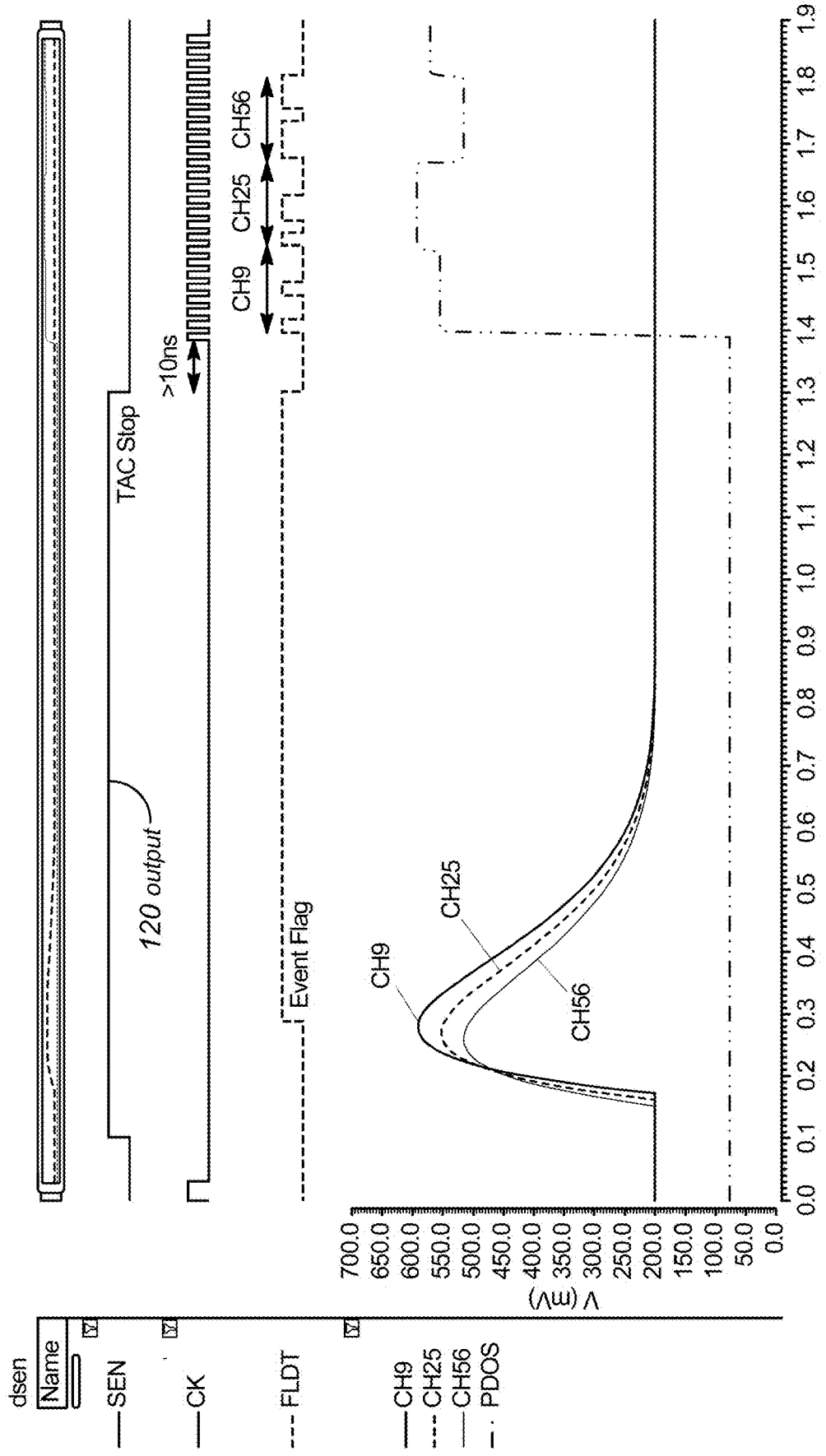
FIG. 18 is a plot of an acquisition and readout of three coincident events that occurred in channels 9, 25, and 56 of an application specific integrated circuit.

In FIG. 4, token passing logic manage access to the data and processing in the exemplary neutron detection system. In use, a token circulate among the nodes/channels seeking information (e.g., the maximum energy levels or peaks of the respective integrations such as peak-1 and/or peak-2, timing information, flag settings, monitoring data, etc.) in a predefined sequence or order. When a node/channel has possession of the token, it has the exclusive right to execute certain processes such as transmitting or reading-out data, differentiating integrals, comparing peaks etc. while other nodes or channels must wait their turn to receive it. Once a node's tasks or communication is completed, the node releases the token to a next node in a predefined sequence. If three events occurred at once in channels 9, 25, and 56, for example, an event flag is generated at the first detected flag and the events are held in memory until readout. As shown by the event flag in FIG. 18, channel 9 is readout first and then reset, and then channel 25 is read out and then rest, and finally channel 56 is readout and then reset.

Figure 5:
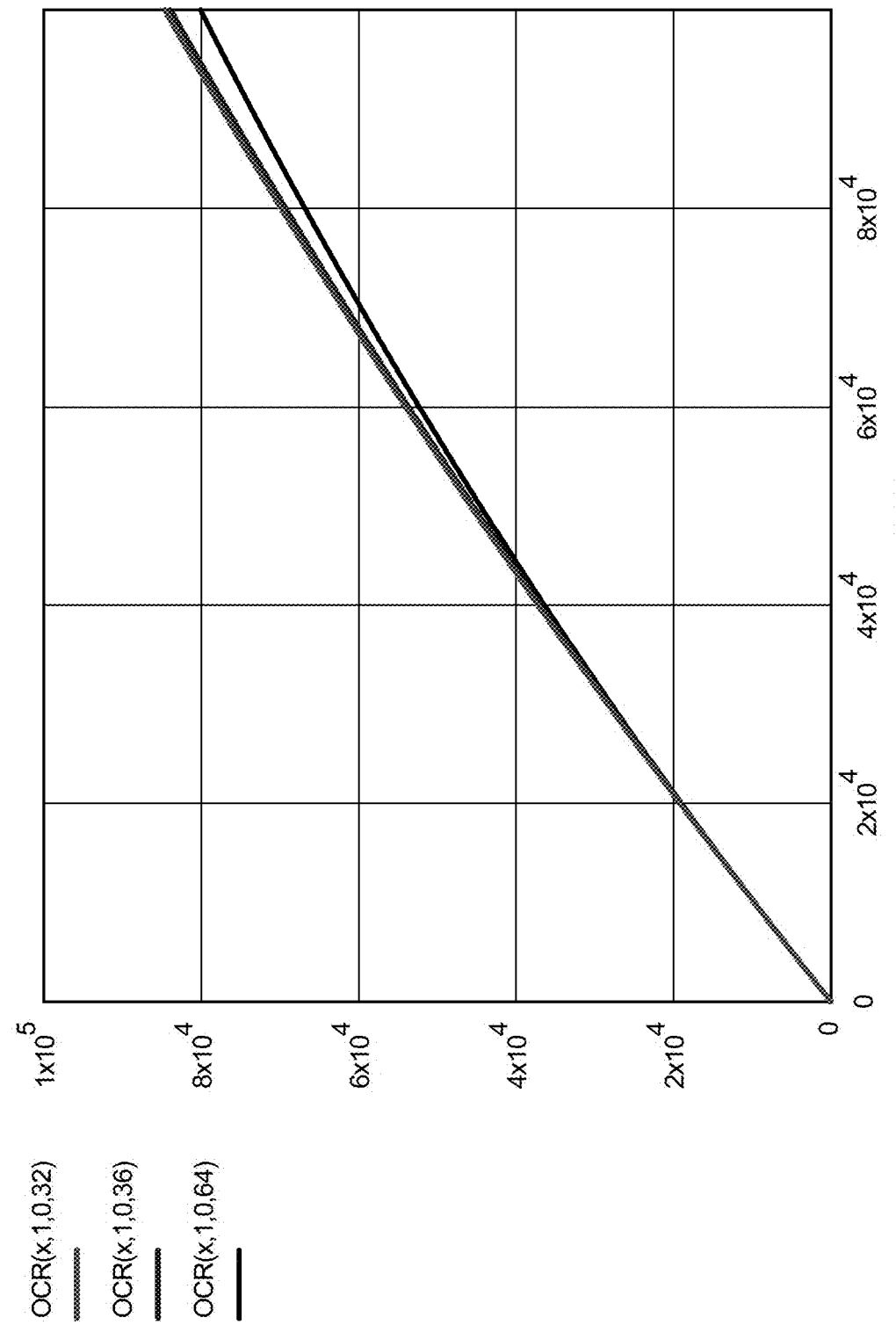
FIG. 5 is an exemplary plot of an output readout count rate vs input count rate per channel.
Figure 6:
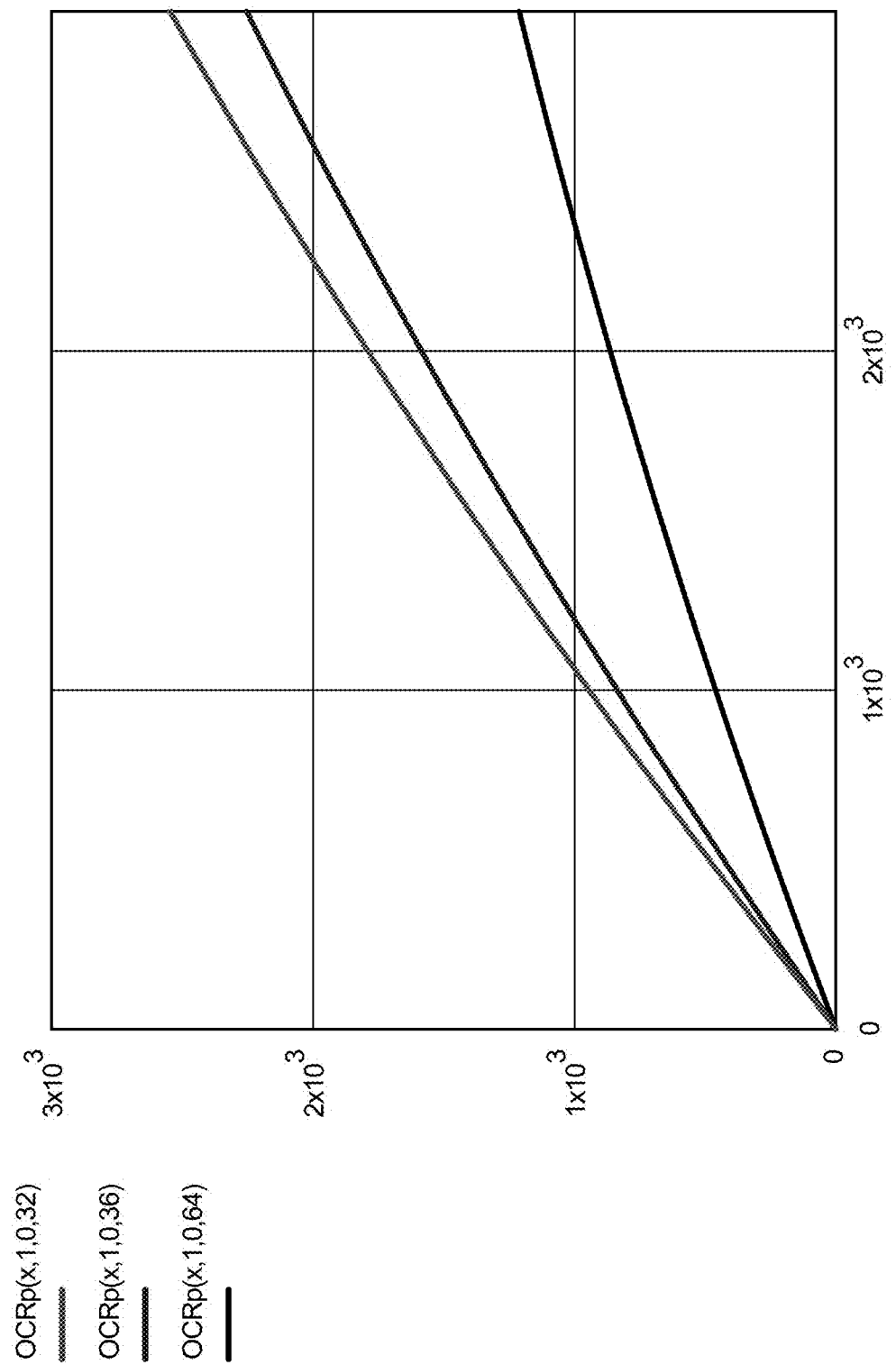
FIG. 6 is an exemplary plot of an output readout count rate vs input count rate for multiple channels such as 32, 36, and 64-channels.
Figure 7:
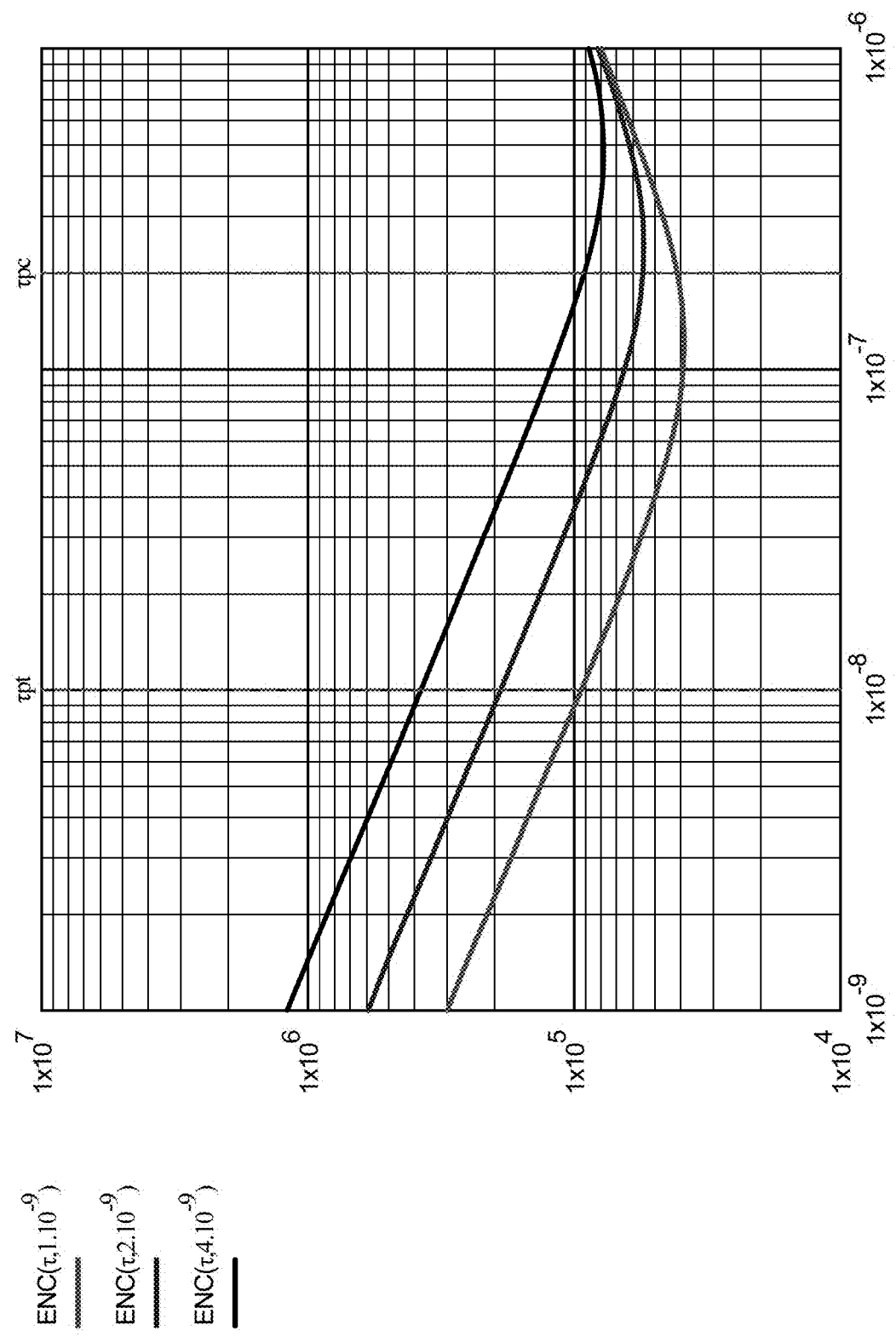
FIG. 7 is an exemplary plot of an equivalent noise charge (ENC) vs peaking time for three silicon-photomultiplier photosensors having three different capacitance, (e.g., 1 nano-farads, 2 nano-farads, and 4 nano-farads).
Figure 8:
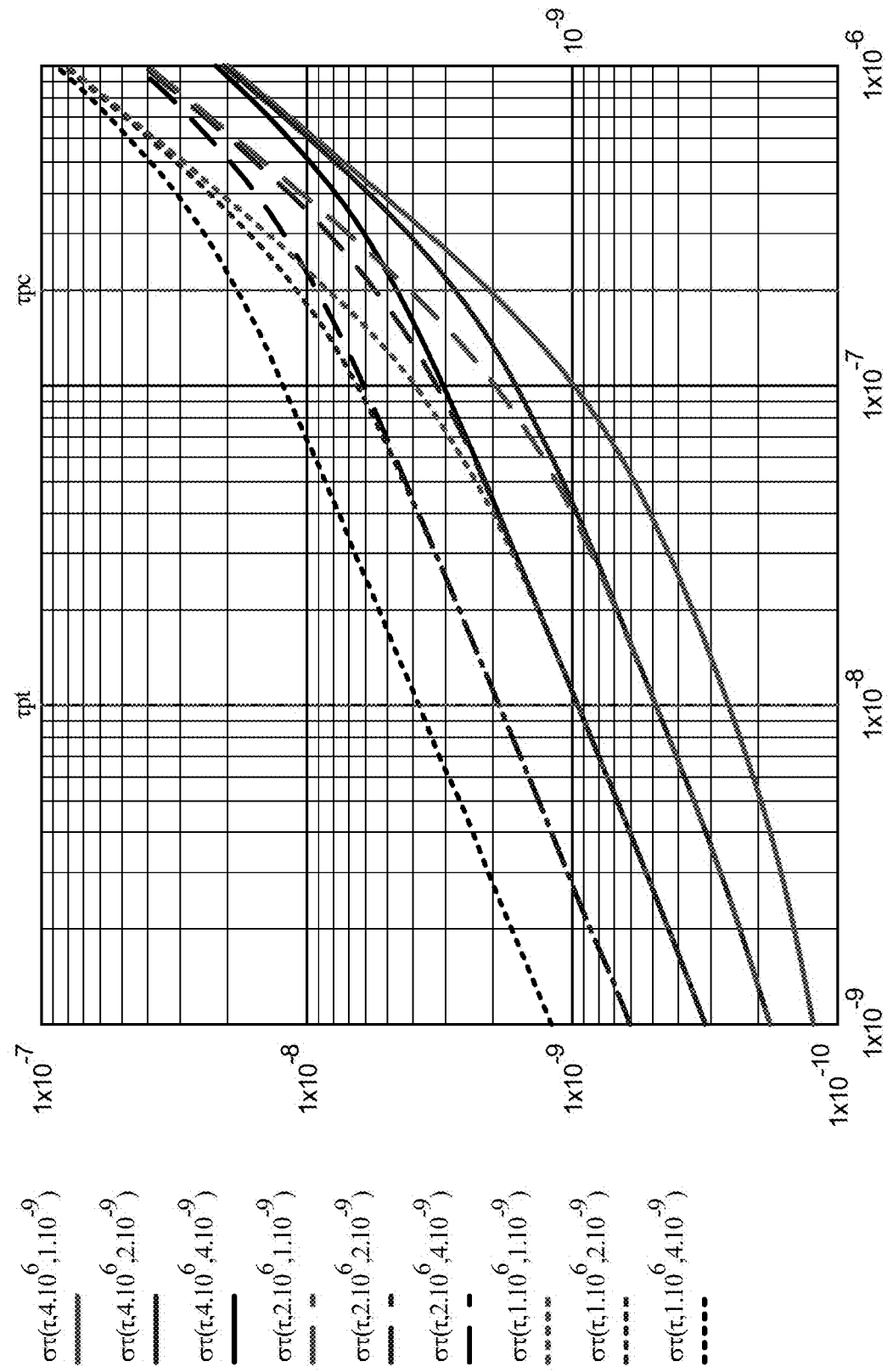
FIG. 8 is an exemplary plot of timing precision (at) versus peaking time for three exemplary silicon-photomultiplier photosensors and three input charges ranging from one million electron to four million electrons (e.g., 1 Me– (million electron), 2 Me–, and 4 Me–).
Figure 9:
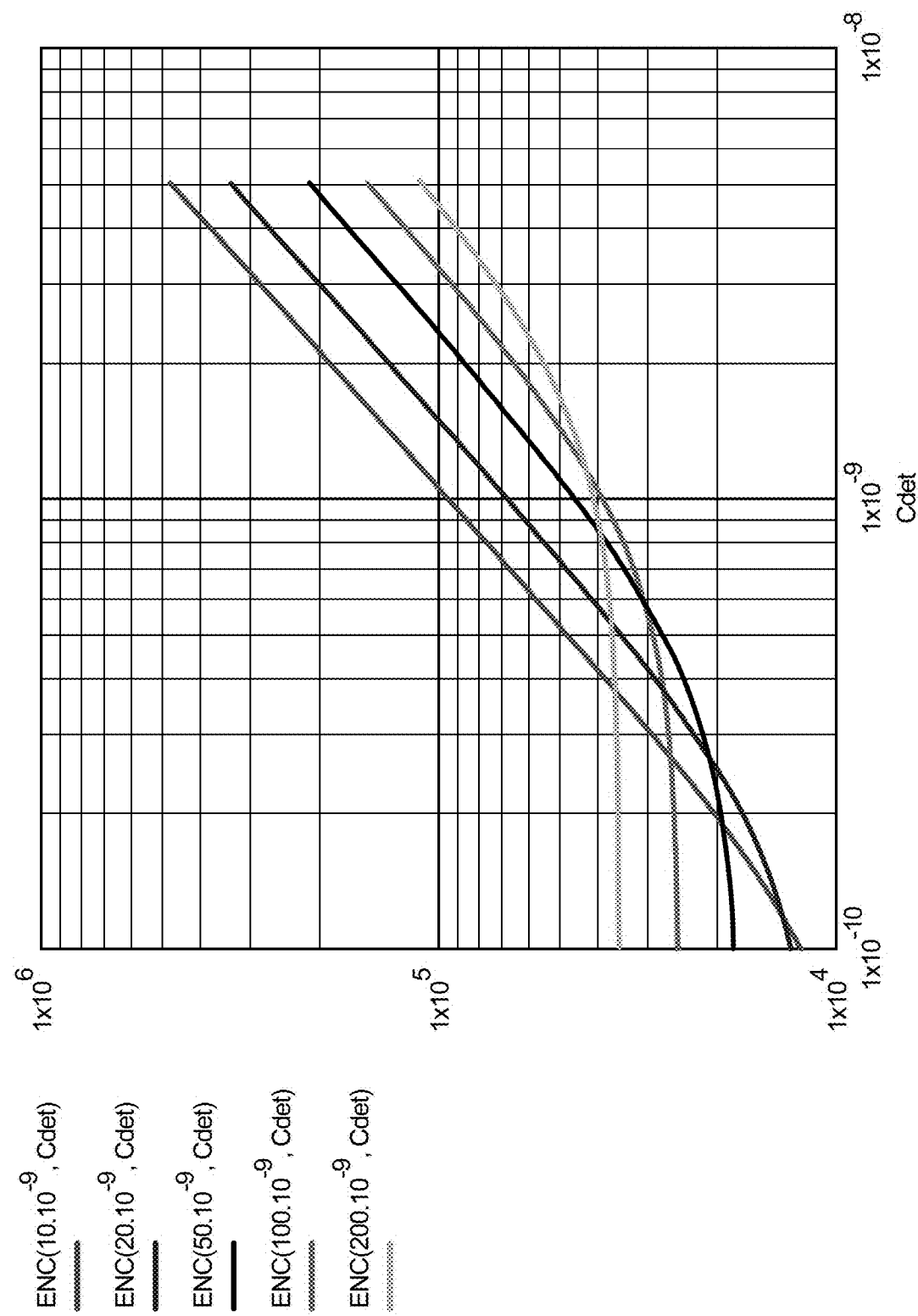
FIG. 9 is an exemplary plot of an equivalent noise charge (ENC) vs sensor capacitance for five peaking time (e.g., 10 nanoseconds, 20 nanoseconds, 50 nanoseconds, 100 nanoseconds, and 200 nanoseconds).
Figure 10:
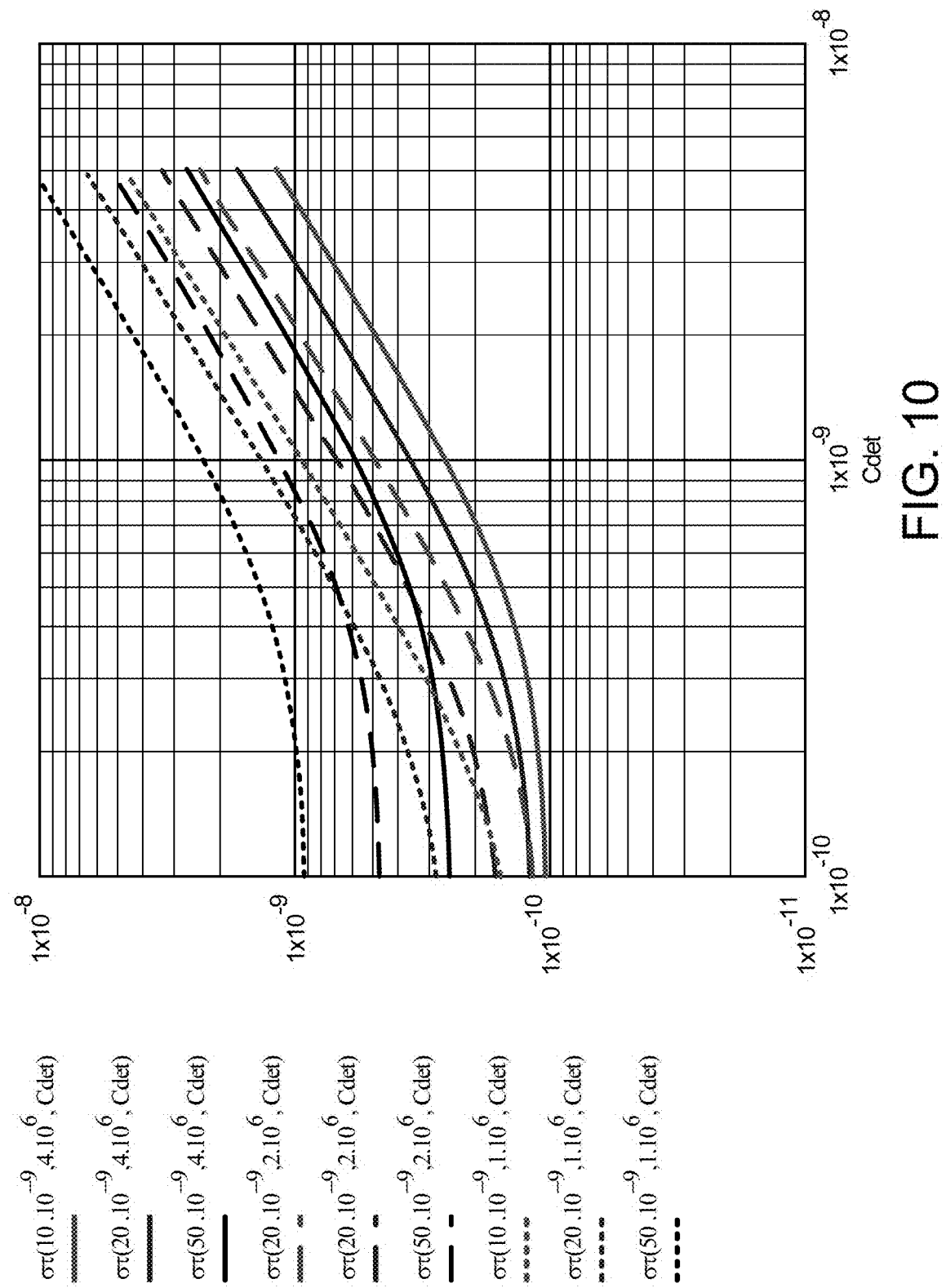
FIG. 10 is an exemplary plot of timing precision (at) versus vs sensor capacitance for three peaking times (e.g., 10 nanoseconds, 20 nanoseconds, and 50 nanoseconds) for three charge values ranging from one million electron to four million electrons (e.g., 1 Me– (million electron), 2 Me–, 4 Me–).
Figure 11:
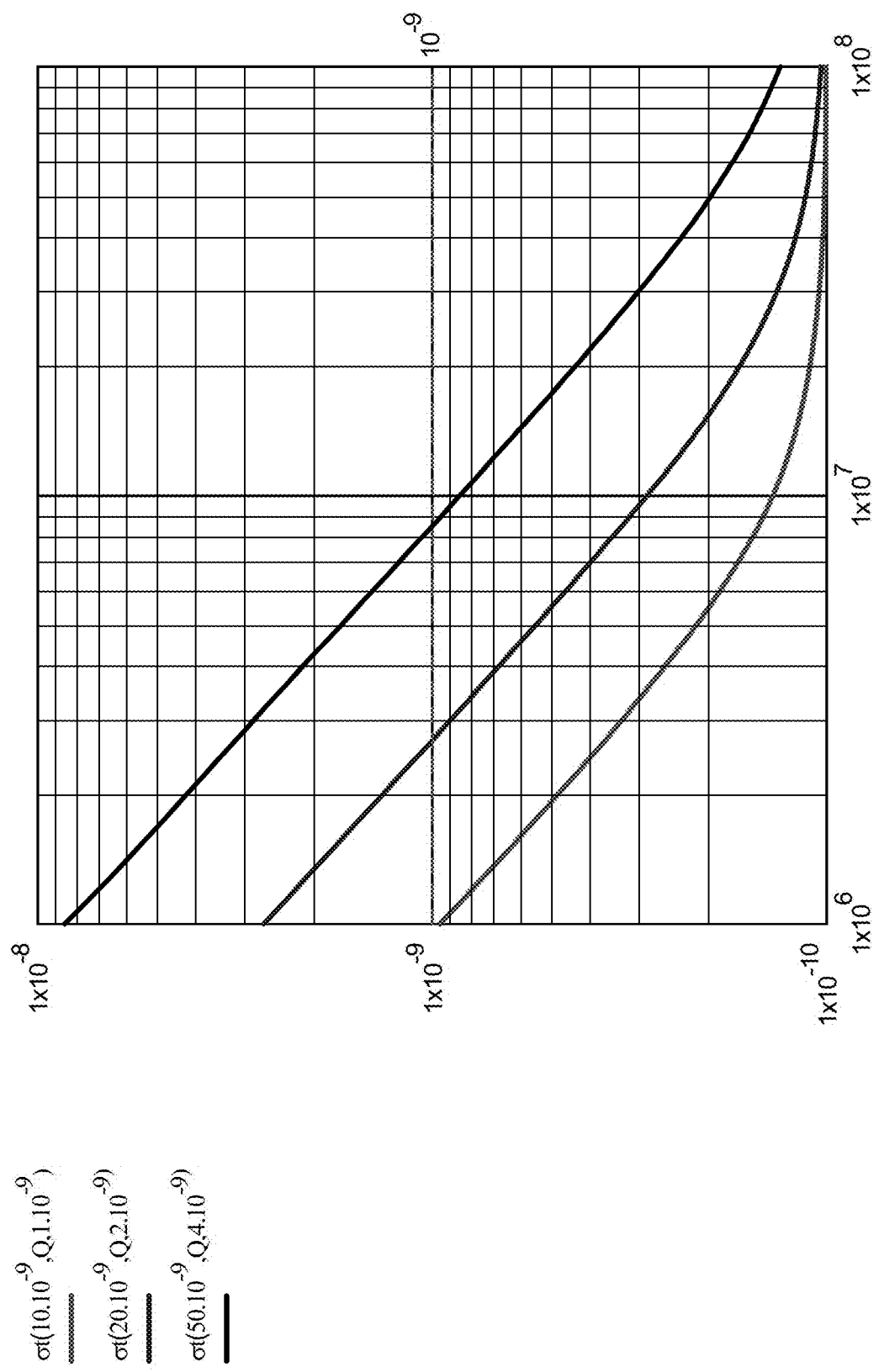
FIG. 11 is an exemplary plot of timing precision (at) versus a number of electrons (Q) for three silicon-photomultiplier photosensors having three different capacitance, (e.g., 1 nano-farads, 2 nano-farads, and 4 nano-farads).

An exemplary readout time for a token clock frequency is about 50 megahertz (MHz) and an analog settling time for external analog-to-digital conversion is about 100 nanoseconds (ns). With an event multiplicity is detected by eight individual microcells or photosensitive elements within a silicon-photomultiplier photosensor, a full readout of a radiation event can require less than about 3 microseconds (μs). FIG. 5 shows an exemplary output count rate (OCR) versus an exemplary input count rate (ICR) for a single channel of the exemplary neutron detection system. FIGS. 1, 3 and 4 show an exemplary signal channel that is replicated (e.g., two or more instances) in an integrated circuit that may also function as exemplary neutron detection system. FIG. 6 shows an exemplary output count rate (OCR) versus an exemplary input count rate (ICR) for channels integrated in a single integrated chip, having 32, 36, 64 signal channels, respectively.

The application specific integrated circuits that render the disclosed functions herein may be practiced in the absence of any disclosed or expressed element (including the components, hardware, the software, and/or the functionality expressed), and in the absence of some or all of the described functions association with a process step or component or structure that are expressly described. The systems may operate in the absence of one or more of these components, process steps, elements and/or any subset of the expressed functions.

Further, the systems may functions with additional or substitute elements and functionality, too. For example, the integration circuits may comprise additional pulse shapers with pulse detectors configured as integrators with independently programmable peak times. Similarly, the validation circuit may include additional or fewer pulse shapers and discriminators with independently programmable peak times and thresholds or boundaries. Some systems are portable and designed to be easily carried around fitting in a knapsack or a bag, for example, making them convenient for use in remote locations. Some alternative systems may include display screen interfaces that may feature touch screens that provide user friendly and intuitive ways to interact with the system. Some systems may interface and support displays that render or stream radiation identification plots, radiation counts, outputs from the circuits and/or render other output associated with radiation detections. Some system may interface location services and include global positioning technology allowing for location-based identification data to be appended to or associated with the radiation discrimination and identifications in the system.

Further, the various elements and system components, and process steps described in each of the many systems and processes described herein is regarded as divisible with regard to the individual elements described, rather than inseparable as a whole. In other words, alternative systems encompass any variation and combinations of elements, components, and process steps described herein and may be made, used, or executed without the various elements described (e.g., they may operate in the absence of) including some and all of those disclosed in the prior art but not expressed in the disclosure herein. Thus, some systems do not include those disclosed in the prior art including those not described herein and thus are described as not being part of those systems and/or components and thus rendering alternative systems that may be claimed as systems and/or methods excluding those elements and/or steps.

In this disclosure the term "substantially" or "about" encompasses a range that is largely in some instances, but not necessarily wholly, that which is specified. It encompasses all but a significant amount, such as what is specified or within five to ten percent. In other words, the terms "substantially" or "about" means equal to or at or within five to ten percent of the expressed value. Forms of the term "cascade" and the term itself refer to an arrangement of two or more components or layers such that the output of one component is the direct input of the next component (e.g., in a series connection). The term "real-time" and "real time" refer to responding to an event or generating objects as events occur, such as rendering a measurement in response to a detection as the detection occurs. A real time operation are those operations which match external activities and proceed at the same rate (e.g., without delay) or faster than that rate of the external activities and/or an external process. Some real-time systems operate at a faster rate as the physical element it is controlling. The term communication, in communication with, and versions of the term are intended to broadly encompass both direct and indirect communication connections. The term "unitary" refers to an indivisible entity, oneness, and singularity. It refers to a single indivisible entity or component.

The disclosed application specific integrated circuits precise and accurate detections and discrimination of radioactive particles. The systems distinguish different types of radiations, particles, and/or its signals and provide output in analog and digital forms with a dynamic range of no less than ten bits. Radioscopic differences may be based on the pulses generated by the scintillators and the silicon photomultipliers they interface. The system can be reconfigured to discriminate between radiation types and/or particles radiating from multiple radiation sources and can distinguish objects or features that are at least 3 millimeters apart from each other and as close as 500 microns or 0.5 mm from each other.

The disclosed systems are modular and mobile allowing user to create panels of multiple sizes with each module being no more than about fifteen pounds in total weight. The system is capable of measuring and record internal timing with a level of precision that is smaller than one billionth of a second, which means it can resolve and measure time intervals of a scale finer than a nanosecond. The system can interact and seamlessly exchange communication with third-party Application Program Interfaces (API) and can employ third party software to control, monitor, analyze, and interact with the disclosed hardware and software such as Novo® and XTK® software, for example. All other third party products including Novo® and XTK® mentioned in this disclosure or referenced in the drawings and third parties are mentioned solely for descriptive purposes and their references do not imply an endorsement, affiliation, or an association with them, their trademarks, their products, or their business.

The systems are configurable to meet the fixed and/or variable requirements of a particular application. The systems include a configurable number of channels formed on a single integrated circuit that allow input such as the pulses generated and amplified by an input including input generated by scintillators and silicon-photomultiplier photosensors. The system is capable of performing spectroscopy on photons, neutrons and gamma rays and can capture or monitor target areas that measure twelve inches in width and twelve inches in height and render the identifications on a display.

Because the system's analog circuits do not require frequent switching between high and low voltages and are purposely built for specific applications including personal mobile device, for example, the system's customization optimizes processing speed, performance, power efficiency in a smaller chip that may be used in mobile radiation detectors. The system's power source is compatible with wide range of commercially available rechargeable batteries ranging from 20-volts to 72-volts making the system lightweight and portable. This adaptability enhances its convenience and versatile for in-field and field-service use.

The system's discrimination analyzes output associated with different events based on the types of particle that created the events, whether it comprise a photon, an electron, a beta particle, a neutron, a deuteron, a triton, an alpha particle, an ionized nucleus, etc., for example. The systems render high precision timing of those events and provide energy information for spectroscopic analysis at a cost of less than one dollar per channel in comparison to systems that cost one-thousand dollars per channel and do not use microchip discriminations.

The application specific integrated circuits can be fabricated using complimentary metal-oxide semiconductors implementing 180 nanometer fabrications, with about 1.8 volts, 3.3 volts direct current voltage supplies that may bias the silicon-photomultiplier photosensors. The integrated power dissipation of the application specific integrated circuits is about 5 milliwatts to 8 milliwatts per channel with the size of the physical layout depending on the number of channels it processes. For an exemplary sixty fours channels, the size can be on the order of eight millimeters by eight millimeters.

In some alternative implementations, a fourteen by fourteen millimeter quad no lead flat package is used with available connections for about one hundred pins. One hundred pins is sufficient for an application specific integrated pin count of sixty four pins with eighteen pins reserved for input and output functions and about eighteen pins reserved for supplies and grounds. In other implementations, the package may comprise a one-hundred and twenty eight pin fourteen-by-fourteen millimeter quad no lead flat package. The package may be ceramic package or a surface mounted integrated circuit, such as a ball grid array.

Other systems, methods, features and advantages will be, or will become, apparent to one with skill in the art upon examination of the figures and detailed description. It is intended that all such additional systems, methods, features, and advantages be included within this description, be within the scope of the disclosure, and be protected by the following claims.

The invention claimed is:

1. An application specific integrated circuit comprising:
   a unitary circuit, including:
   a differential amplifier circuit having a programmable gain that amplifies a radiation detection signal;
   a first pulse shaper circuit configured to generate a full integration of an amplified radiation detection signal;
   a second pulse shaper circuit configured to generate a partial integration of the amplified radiation signal simultaneously with the full integration by the first pulse shaper circuit; the second pulse shaper and having a peak time adjustable range less than the peak time adjustable range of the first pulse shaper;
   a third pulse shaper circuit configured to generate a timing signal simultaneously with the partial integration by the second pulse shaper and the full integration by the first pulse shaper circuit and having a peak time adjustable range less than the peak time adjustable range of the second pulse shaper;
   a first peak detector circuit configured to measure and store a maximum value of the full integration;
   a second peak detector circuit configured to measure and store a maximum value of the partial integration;
   a time to amplitude converter configured to measure an incidence of a radiological event that generated the radiation detection signal in a form of a voltage ramp; and
   a controller configured to enable a transfer of the maximum value of the full integration, the maximum value of the partial integration, and the voltage ramp to an interface in response to a full integral of the radiation detection signal exceeding a first predetermined threshold and a partial integral of the radiation detection signal exceeding a second predetermined threshold.

2. The application specific integrated circuit of claim 1 further comprising a programmable biasing circuit that applies a programmable bias to the differential amplifier circuit and a plurality of silicon photomultiplier detectors that generate the radiation detection signal.

3. The application specific integrated circuit of claim 2 further comprising a plurality of unitary circuits with each unitary circuit in communication with the plurality of silicon photomultiplier detectors, each unitary circuit being in communication with a different plurality of silicon photomultiplier detectors.

4. The application specific integrated circuit of claim 3 where each unitary circuit is configured to process signals generated by the plurality of silicon photomultiplier detectors independently, in parallel, and in real time.

5. The application specific integrated circuit of claim 4, where the differential amplifier, the pulse shaper circuit, the second pulse shaper circuit, the third pulse shaper circuit, the first peak detector circuit, and the second peak detector circuit comprise analog circuits.

6. The application specific integrated circuit of claim 1, where the differential amplifier, the first pulse shaper circuit, the second pulse shaper circuit, the third pulse shaper circuit, the first peak detector circuit, and the second peak detector circuit comprise analog circuits.

7. The application specific integrated circuit of claim 1 further comprising a logic circuit that discriminates between a neutron incidence and a gamma ray incidence by a comparison of the maximum value of the full integration to the maximum value of the partial integration.

8. The application specific integrated circuit of claim 1 where the first pulse shape, the second pulse shaper, and the third pulse shaper comprise programmable time constants adjustable in real time.

9. The application specific integrated circuit of claim 1 where the where the first peak detector circuit, the second peak detector circuit, and the time to amplitude converter are configured to transmit the maximum value of the full integration, maximum value of the partial integration, and the voltage ramp to a remote interface simultaneously.

10. An application specific integrated circuit comprising:
a differential amplifier circuit having a programmable gain that amplifies a radiation detection signal generated by one or more silicon photomultiplier detectors;
a first pulse shaper circuit programmed to generate a full integration of an amplified radiation detection signal;
a second pulse shaper circuit programmed to generate a partial integration of the amplified radiation signal simultaneously with the full integration by the first pulse shaper circuit; the second pulse shaper and having a peak time adjustable range less than the peak time adjustable range of the first pulse shaper;
a third pulse shaper circuit programmed to generate a timing signal simultaneously with the partial integration by the second pulse shaper and the full integration by the first pulse shaper circuit and having a peak time adjustable range less than the peak time adjustable range of the second pulse shaper;
a first peak detector configured to measure and store a maximum value of the full integration in an onboard memory;
a second peak detector configured to measure and store a maximum value of the partial integration in the onboard memory;
a time to amplitude converter configured to measure an incidence of a radiological event that generated the radiation detection signal expressed in a voltage range; and
a controller programmed to enable a transfer of the maximum value of the full integration, the maximum value of the partial integration, and the voltage range to an interface in response to a full integral of the radiation detection signal exceeding a first predetermined threshold, a partial integral of the radiation detection signal exceeding a second predetermined threshold;
where the controller is further programmed to generate a programmable validation based on the full integration of an amplified radiation detection signal and the timing signal and is programmed to disable the transfer of the maximum value of the full integration, the maximum value of the partial integration, and the voltage range when the full integration of an amplified radiation detection signal is less than a predetermined value.

11. The application specific integrated circuit of claim 10 further comprising a programmable biasing circuit that applies a programmable bias to the differential amplifier and a plurality of silicon photomultiplier detectors that generate the radiation detection signal.

12. The application specific integrated circuit of claim 11 further comprising a plurality of unitary circuits with each unitary circuit in communication with the plurality of silicon photomultiplier detectors, each unitary circuit being in communication with a different plurality of silicon photomultiplier detectors.

13. The application specific integrated circuit of claim 12 where differential amplifier circuit, first pulse shaper circuit, the second pulse shaper circuit, the third pulse shaper circuit, first peak detector, second peak detector comprise a unitary circuit and each unitary circuit is configured to process signals generated by the plurality of silicon photomultiplier detectors independently, in parallel, and in real time.

14. The application specific integrated circuit of claim 13, where the differential amplifier circuit, the pulse shaper circuit, the second pulse shaper circuit, the third pulse shaper circuit, the first peak detector circuit, and the second peak detector circuit comprise analog circuits.

15. The application specific integrated circuit of claim 10, where the differential amplifier circuit, the first pulse shaper circuit, the second pulse shaper circuit, the third pulse shaper circuit, the first peak detector, and the second peak detector comprise analog circuits.

16. The application specific integrated circuit of claim 10 further comprising a logic circuit that discriminates between a neutron incidence and a gamma ray incidence by a comparison of a partial integration of the radiation detection signal during a peaking time to the full integration of an amplified radiation detection signal.

17. The application specific integrated circuit of claim 10 where the first pulse shape, the second pulse shaper, and the third pulse shaper have programmable time constants adjustable in real time.

18. The application specific integrated circuit of claim 10 where the where the first peak detector, the second peak detector, and the time to amplitude converter are configured to transmit the maximum value of the full integration, the maximum value of the partial integration, and the voltage range to a remote interface simultaneously.

19. The application specific integrated circuit of claim 10 where the a controller is further programmed to enable the transfer of the maximum value of the full integration, the maximum value of the partial integration, and the voltage range to an interface in response a first discriminator circuit comparing the full integral of the radiation detection signal exceeding to a first predetermined threshold, a first discriminator circuit comparing an output of the third pulse shaper to a second predetermined threshold.

20. The application specific integrated circuit of claim 10 further comprising a display interface that renders radiation identifications in response to a comparison of the maximum value of the full integration to the maximum value of the partial integration.

* * * * *